United States Patent [19]

Webb et al.

[11] 4,006,260
[45] Feb. 1, 1977

[54] METHOD AND APPARATUS FOR EVAPORATION OF MOISTURE FROM FRUIT AND VEGETABLE PARTICLES

[75] Inventors: Wells A. Webb, Orovada, Nev.; William R. Webb, Berkeley, Calif.

[73] Assignee: Wells A. Webb, Orovada, Nev.

[22] Filed: Jan. 29, 1975

[21] Appl. No.: 544,959

[52] U.S. Cl. .............................. 426/438; 426/445; 426/465

[51] Int. Cl.$^2$ ..................... A23B 7/02; A23L 1/325

[58] Field of Search .......... 426/102, 616, 640, 645, 426/426, 438, 440, 465, 467, 445; 34/15; 99/403, 410, 469, 470, 472, 483, 516; 126/271

[56] References Cited
UNITED STATES PATENTS

| | | | |
|---|---|---|---|
| 2,283,302 | 5/1942 | Webb | 426/102 |
| 3,194,670 | 7/1965 | Dorsey et al. | 426/438 |
| 3,615,724 | 10/1971 | Sech | 426/438 |
| 3,718,485 | 2/1973 | Lankford | 426/438 |
| 3,841,302 | 10/1974 | Falbel | 126/271 |

Primary Examiner—A. Louis Monacell
Assistant Examiner—R. A. Yoncoskie
Attorney, Agent, or Firm—Brown & Martin

[57] ABSTRACT

A method and apparatus for evaporating and condensing moisture from a procession of prepared fruit and vegetable particles at subatmospheric pressures, to manufacture puffed, low-moisture food products.

A series of stations of decreasing pressure and increasing temperature is established within the dehydrating apparatus, and the procession of food particles is led and guided by the apparatus to pass systematically from station to station of the series for dehydration treatment. As the particles advance through the series of stations of successively lower pressure, they encounter an oil temperature in each succeeding station which is higher, and a vapor head pressure which is lower, than in the preceding station. By the time leading particles have traversed all stations of the series, they have become puffed and dehydrated. Then they are cooled by contact with cool oil to fix the puffed condition, the oil is then removed from contact with the particles in a centrifuge, and the finished food particles are then removed from the centrifuge and restored to atmospheric condition, without disturbing the regular progress of entry and dehydration of the following particles of the procession.

20 Claims, 26 Drawing Figures

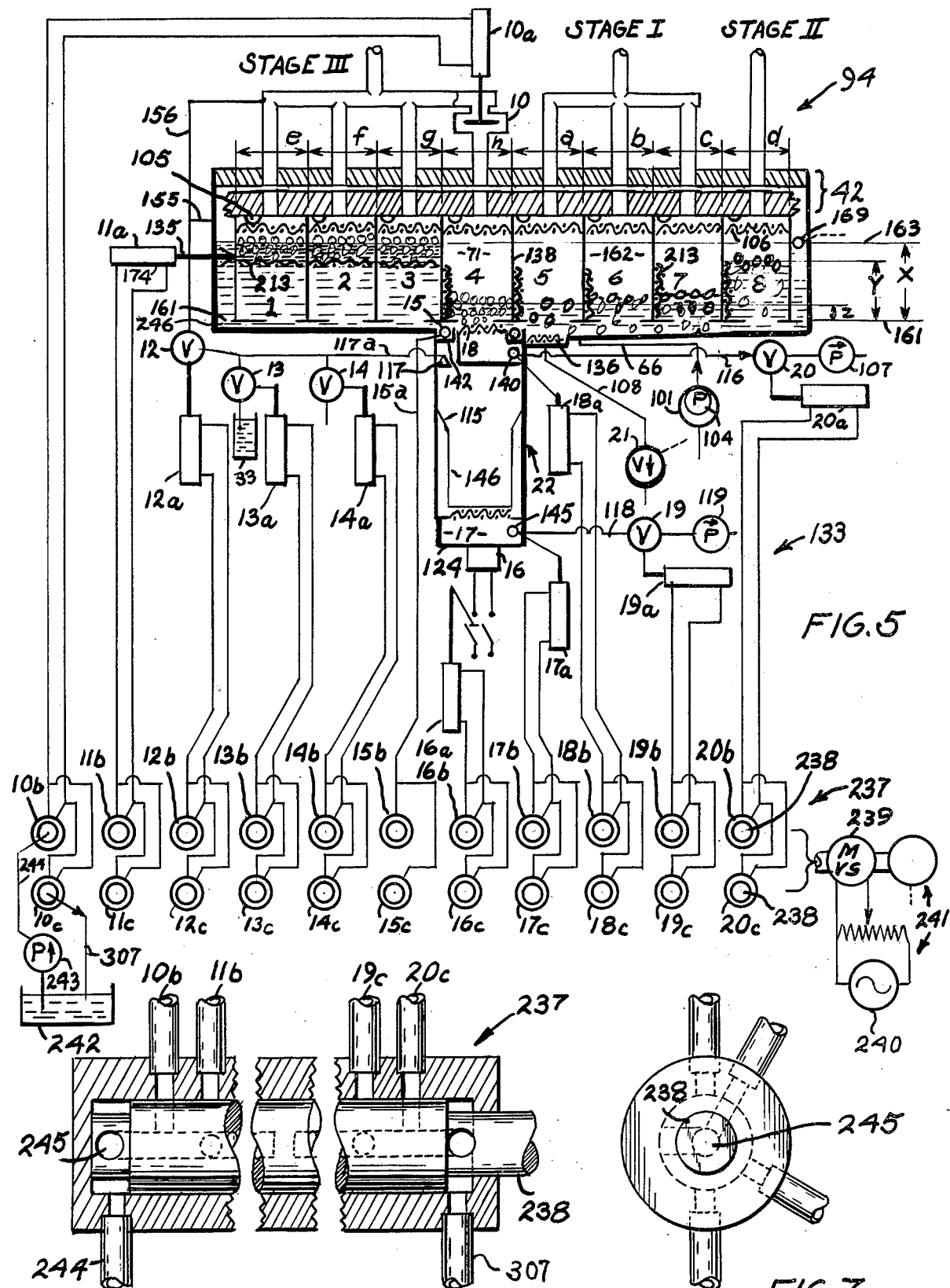

STAGE I
STAGE II
STAGE III

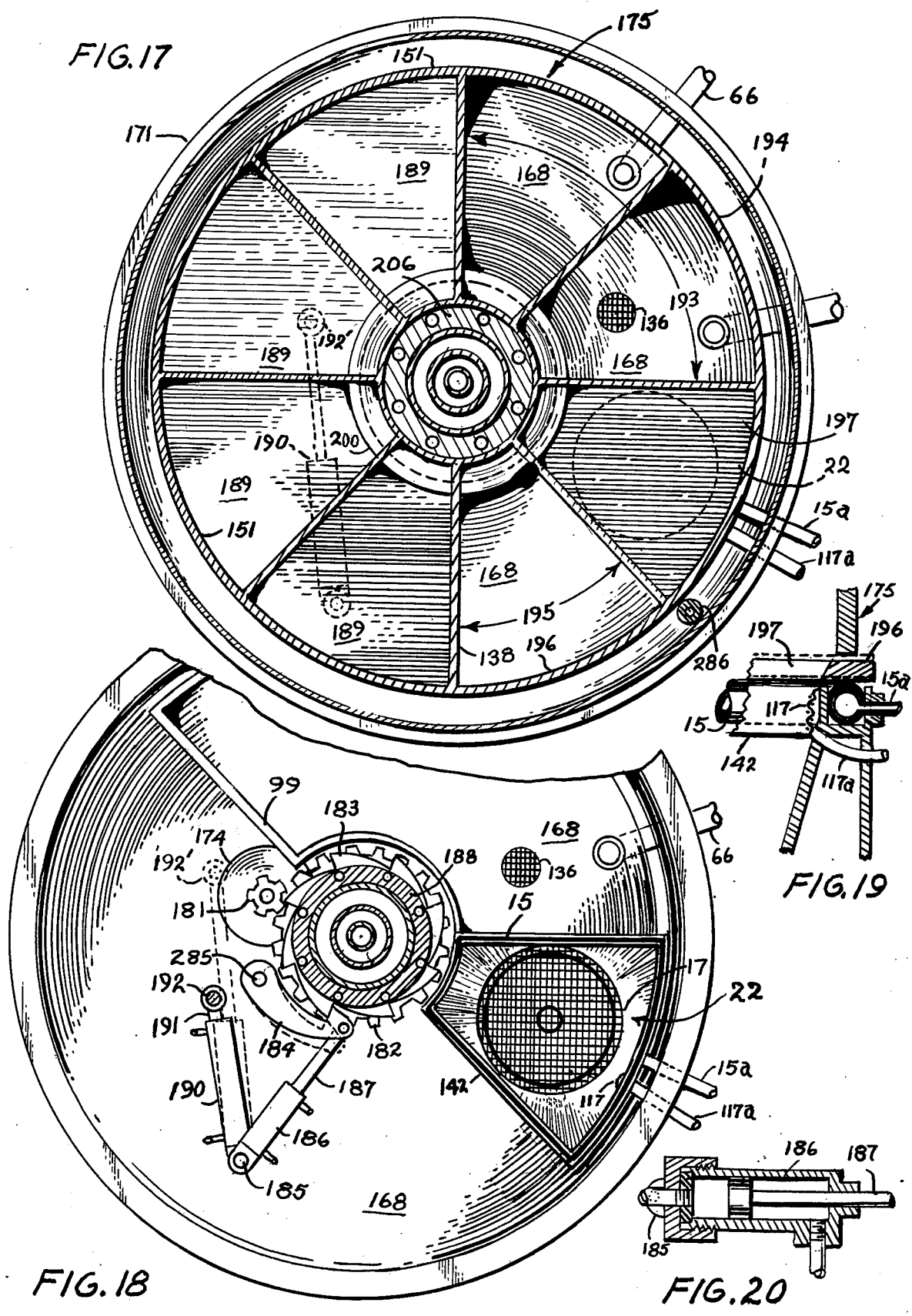

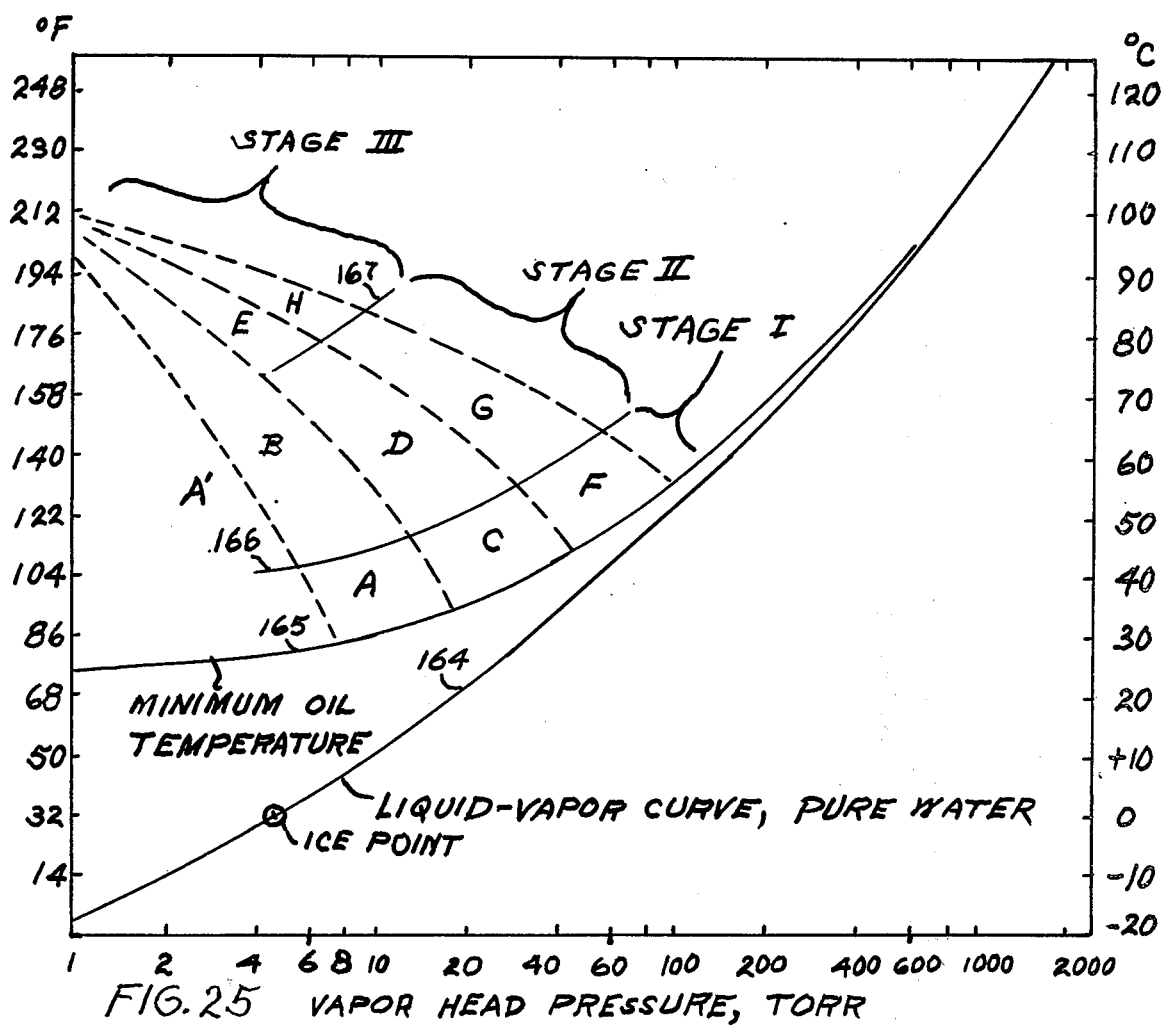
FIG. 25  VAPOR HEAD PRESSURE, TORR
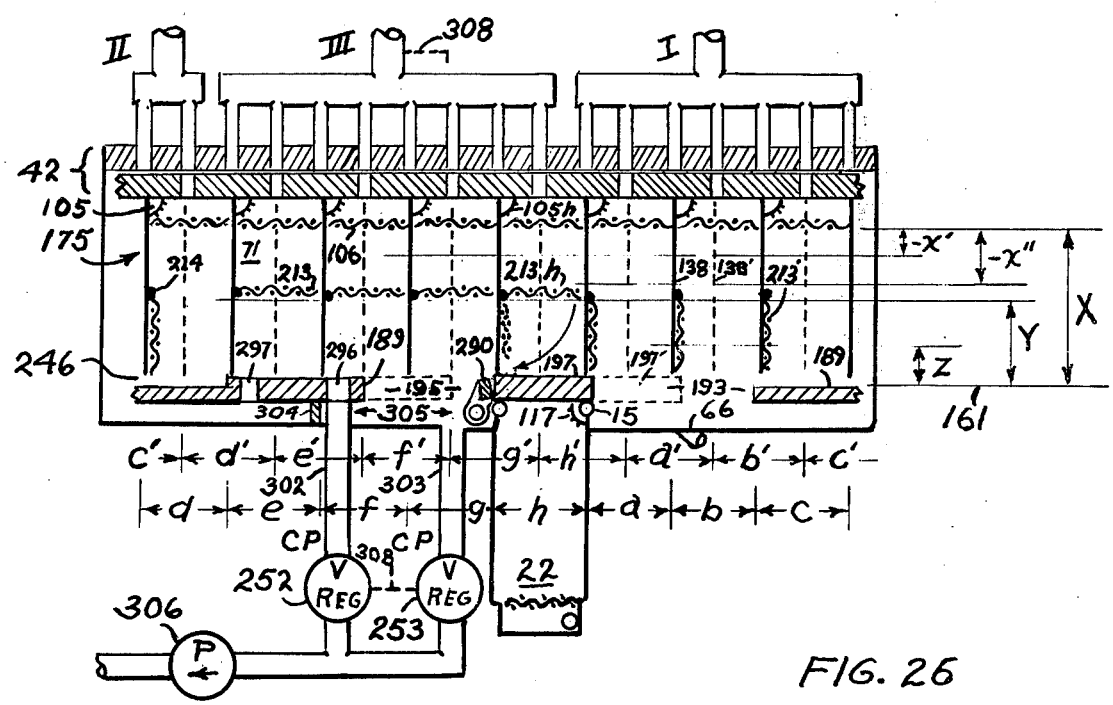
FIG. 26

METHOD AND APPARATUS FOR EVAPORATION OF MOISTURE FROM FRUIT AND VEGETABLE PARTICLES

BACKGROUND OF THE INVENTION

The present invention relates to the preservation of fruit and vegetable particles and pertains particularly to such preservation by dehydration.

Preservation by evaporation of moisture is an ancient art, and has advantages over other methods. Weight is reduced, making transportation and storage less expensive; the food may be kept in temperate climates for long periods without refrigeration; the flavor is concentrated and pleasing for that reason, in raisins, dates, slices of onions, apples, and the like.

The development of dehydrating methods to the present time is set forth in FIG. 1. Curves 30–31 show the time of exposure to the weather for traditional methods whereby the particles are laid out in the sun on trays to dry for four or more days, during which time they also collect dust and are usually darkened by the sun's ultraviolet rays. The moisture content is reduced by evaporation from the initial value of about 80% to the range of 25% to 15%. Despite the concentrations in sweetness that accrued as the result of this drying, objections arose to the products for their darkened color, and the dust and dirt they accumulated. Some consumers also found the caramelized quality of fruit sugars that was generated to a small extent in some products to be objectionable, and this caramelization was found to be due to prolonged overheating in the hot sun.

Enclosed kilns were developed that blew heated dry air at about 65° C. over the fruit on trays, and between particles laid out on a perforated kiln floor. To preserve the natural color, especially of apple slices, apricot and pear halves and Thompson seedless raisins, the particles were treated to heavy doses of sulfur dioxide, and also sometimes were dipped in solutions of sulfites and other chemical preservative. The result was an attractive product for eye-appeal, but many people who ate these products developed an aversion to the taste of the sulfur compounds that were associated with the food.

Strong objections to toxic concentrations of sulfur compounds were written into law that set the maximum permissible $SO_2$ level at a low concentration that made prolonged storage at room temperature impossible without darkening, especially in apples and apricots. It was found that refrigerated storage prevented dark colors from developing. The added cost of refrigerated storage made dried fruits uncompetitive with refrigerated fresh fruits except when the storage period was longer than the refrigerated storage life of fresh fruits, as in the spring and early summer in the Northern Hemisphere.

Refrigerated shipments of fresh fruits from Australia and other Southern Hemisphere fruit and vegetable-growing areas have recently made fresh fruits available in the United States all year round, but the price of such produce on the fresh fruit markets has often been prohibitive to mass marketing, and only the fancy food stores can sell such imported fruits at a profit. Bananas can be shipped from Central America and sold at a profit at a relatively low price because of the steady demand and steady production rate of this fruit that keeps refrigerated ocean transports continually busy. However, bananas are also grown on the Hawaiian Islands that are not shipped to the Mainland. This is because Hawaiian bananas are of a variety that do not sustain high quality even in refrigerated storage, and they deteriorate in a very few days after picking. The same applies to Hawaiian pineapple, which is most tasty when fully ripe, but which cannot reach the Mainland by boat in the prime condition, and must be shipped green and ripen on the grocery store shelf, a method not conducive of the development of the high pineapple flavor potential.

Flavor is all-important, and the secret of success in fruit and vegetable marketing is to provide a product that has fully matured before harvesting, and preserve that flavorful product at low cost, and transport it in large quantities to sell at low unit profit on the mass markets.

Canned and frozen fruits and vegetables have met that criterion for many years, but recently the increases in labor and energy costs for sterilizing, for refrigeration, and for the manufacture of steel sheets for cans, have sharply increased the retail prices of these goods.

We have found that the best way to provide the consumer with a high-quality fruit and vegetable product at lowest prices is through dehydration and puffing the product by the method of the present invention, which is an improvement over other attempts to provide an acceptable low-moisture fruit or vegetable.

Improvements in process that resulted in a light-colored low-moisture product of about 3½% moisture content and low-sulfur content were proposed by C. C. Moore in U.S. Pat. Nos. 1,543,948 issued June 30, 1925, and 2,023,536 issued Dec. 10, 1935. Moore imparted heat to the fruit in a vacuum environment under the conditions of FIG. 1 curve 32, and in about four hours reduced the sulfur to a few hundred ppm, and the moisture to the range where the fruit solids were hard and brittle when cooled. However, this process did not produce an attractive, easily reconstituted comestible, for the product such as apple slices, apricot halves, grapes, and the like dried by that process were exceedingly tough when cold. Moore also dehydrated fresh fruit in accordance with the condition of curve 34.

Moore's method was improved upon by a method that produced a tender puffed fruit of about 2% to 3% moisture content by briefly heating the product rapidly to create pores within the particles, then by cooling and hardening the fruit when dry and puffed, the porous structure was preserved thereby producing a tender puffed product. This invention, patented in U.S. Pat. No. 2,110,184, issued Mar. 8, 1938 still required two drying steps to be used. According to curve 30, the fruit was prepared with sulfur compounds and dried to about 20% moisture in a conventional kiln, and then was dried in a second step, curves 32–36 in vacuum, to produce a highly successful staple of commerce called "Apple Nuggets". This two-step process, requiring labor for manipulation of trays and high energy consumption, at first not an important item in production costs, is now a disadvantage, because labor and energy have become major items of cost of production with present-day fuel prices and labor making the price of such products beyond the means of the mass market.

In the effort to reduce manufacturing cost and at the same time to produce a superior low-moisture puffed fruit, without the use of $SO_2$ and to carry out the dehydration in a single drying step, Webb developed further improvements in process and apparatus. In U.S. Pat.

No. 2,473,184, issued June 14, 1949, he shows an improved process that is carried out in his apparatus of U.S. Pat. No. 2,587,939, issued Mar. 4, 1952, and supplies the product described in U.S. Pat. No. 2,283,302, issued May 19, 1942. By the foregoing process, fresh slices of fruit containing about 80% moisture can be dehydrated to about 2½% moisture according to the schedule of curve 38, in about 2 hours. The fruit was discharged with a substantial film of oil clinging thereto, which was objectionable. Also, the process required hand labor for filling and emptying trays of fruit and for the skilled manipulation of the many valves regulating the process events. Heat for the process came as steam from a high pressure boiler which burned furnace oil or the like.

In the performance of vacuum dehydration of foods using a liquid heat transfer medium under the present state of the art, no attempt is made to utilize inexpensive heat sources such as solar rays, geothermal or by-product steam, which sources are available to supply large quantities of heat at relatively low cost and low temperatures, that is, at 125°–65° C, or even lower temperatures. Also, no improvement has been added to the art of inexpensively condensing the vapors that arise from foods being dehydrated in such vacuum dehydrators.

Thus Lankford, in Pat. No. 3,718,485, issued Feb. 27, 1973, condenses his vapor on refrigerated coils. Such condensation requires operation of a prime move to provide energy to compress the refrigerant, and the energy which is put in the oil heater to heat the liquid heat transfer medium must eventually be removed from the system by the refrigerator. Owing to the multiplicity of heat transfer means employed, from the steam heater to the oil, to the food particles, thence to the vapor arising out of the food, thence to the refrigerating coils and the refrigerant cooling coils of the compressor, the prime mover that drives the compressor must provide several times more energy into the refrigerator compressor than is supplied by the steam oil heater. Refrigerant energy is one of the most costly forms of energy, and Lankford uses it most inefficiently to transfer heat.

Many inventions in the "freeze-dry" art have been made of recent years whereby excellent fruit and vegetable products are preserved through sublimation of moisture from the frozen comestible under vacuum conditions of 1 torr and even lower absolute pressures. To reach these extremely low pressures commercially requires massive vacuum pumps and high-capacity refrigeration systems to cool surface condensers to cryogenic temperatures. Such systems are highly consumptive of energy and capital. Energy cost, interest on capital expenditures, and maintenance, plus hand labor necessary for loading and unloading food trays, make freeze-dried foods so costly to manufacture that these foods can be afforded only in exceptional instances, such as to feed mountain-climbing expeditions and astronauts.

Systematic production of desired large-diameter, thin puffed wafers of ripe banana, pineapple and the like, has been thwarted by slices sticking or abrading during processing.

Batch methods for carrying out dehydration processes are described in the aforementioned U.S. patents. Among the disadvantages that are inherent in batch methods is the requirement that the single vacuum system absorb water vapor over the whole range of dehydration, from normal atmospheric pressure of 760 torr to the final pressure of 3 torr. A single system cannot be as efficient as a multiple system of the present invention where each vacuum component operates continuously over the range within which it is the most efficient.

SUMMARY AND OBJECTS OF THE INVENTION

It is the primary object of the present invention to provide a method and apparatus to overcome the above problems of the prior art by automation and operation with low-temperature and ambient thermal resources and thereby produce puffed fruit products at low cost.

Another object of the present invention is to provide automatic apparatus for the manufacture of low-moisture puffed fruit particles from fresh fruit particles.

Another object of the present invention is to provide method and apparatus for utilizing solar energy for the rapid evaporation of the major portion of the natural moisture of fresh fruit particles without causing caramelization of the sugars of the fruit, and without darkening the natural color of the fruit particles, and without the addition of an artificial preservative or other contaminants or adulterants.

Another object is to provide an efficient heat transfer chain to transfer heat at comparatively low temperature from a heated water layer to an oil layer so as to simultaneously heat and purify the oil, making the heated oil suitable for contacting fruit and other comestibles without imparting undesirable flavors to the comestible.

Another object is to provide an efficient method for utilizing heat at relatively low temperature, in a liquid heat transfer medium, to dehydrate and puff thin, large-diameter slices of ripe fruit, in zones of controlled subatmospheric pressure.

Another object is to provide a means for support of delicate slices and transport through stages of decreasing pressure and increasing temperature without materially damaging the slices.

Another object is to provide an efficient method for utilizing heat at relatively low temperature, for dehydration, such as solar energy from hot water in a solar water heater, thence to the surfaces of food particles in a series of vacuum dehydration stages.

Another object is to provide method and apparatus for contacting a procession of food particles at subatmospheric pressure with liquid heat transfer medium at progressively higher temperatures.

Another object is to provide means for removing water vapor at progressively lower absolute pressures from the procession of food particles which is being dehydrated at subatmospheric pressures.

Another object is to provide a system for efficiently maintaining zones or stations of varied subatmospheric pressure of water vapor, in the presence of a liquid heat transfer medium, and advancing a procession of food particles through such zones so that the particles are subjected to progressively lower absolute pressure and increasing temperature of the liquid medium, as they advance from an entrance point to an exit point.

Another object of the present invention is to provide apparatus for the automatic production of a procession of low-moisture puffed fruit particles containing edible oil in the pores thereof.

Another object is to provide method and apparatus for elimination of free oil from the surfaces of the puffed particles, while preserving the puffed structure.

A further object is to provide a method for evaporating the major portion of the natural moisture of fruit particles under conditions of subatmospheric pressure such that the moisture vapor may be condensed on surfaces that are maintained at temperatures close to the temperature of the ambient atmosphere.

A further object is to provide a method for evaporating the major portion of the moisture of fruit particles in a thermodynamic system that utilizes a liquid heat transfer medium and low-cost heat sources at temperatures below the boiling point of water at normal atmospheric pressure.

In accordance with the present invention, a vegetable oil is heated and purified by contact with a layer of heated water or by other suitable means, such as a surface heat exchanger, and a centrifugal oil purifier, and is injected into a region of subatmospheric pressure to contact food particles to be dehydrated. The particles and the oil are conveyed together in a multi-stage process through regions of progressively higher temperature below the caramelization temperature of the fruit sugars or other heat-sensitive component of the particles for the duration of the process, and the pressure of the successive regions is progressively reduced in stages to about 3 torr, until substantially all the moisture of the fruit has evaporated, and has been condensed in a condenser cooled by prevailing natural means. Then the hot, puffed food particles, containing about 2% moisture, are cooled by immersion in oil that has been cooled by ambient means, the oil is then removed from contact with the surfaces of the particles, and the particles are removed from the low-pressure environment into normal atmosphere without disturbing portions of the product that had been introduced into earlier stages of the process and are now undergoing simultaneous processing in the vacuum regions.

The present invention utilizes a multiple pressure subatmospheric vacuum system for condensing water vapor from a continuous vacuum dehydrator that treats a procession of food particles to evaporation by a liquid heat transfer medium in contact with the particles. The major component of the moisture of the particles is evaporated at a relatively low temperature of the heat transfer medium, and at a relatively high subatmospheric pressure. A minor proportion of the moisture is evaporated at a relatively higher temperature of the heat transfer medium, and at a relatively low subatmospheric pressure. The separate vapor streams are absorbed in separate divisions of the vacuum system that operate at maximum efficiency within the range of pressures of the vapor streams with which they are respectively connected.

"Fruit" is used in this specification to include also "vegetable", and "particle" is used to designate a cut piece of fruit or vegetable of a size suitable for processing by the method described, and may also designate whole grapes and other small whole fruit or vegetable, which is processed without cutting. The process is also applicable to piece-meat such as shrimp, chicken, etc. "Macropore" is an enlarged cavity inside the particle produced by expansion of vapor therein. "Case-hardening" is the condition that is produced on the surfaces of some particles such as slices or dices of apple, wherein the surface of the particle has been quickly dried in the process to be described, and offers resistence to the escape of water vapors from the interior of the particle, resulting in the build-up of a substantial difference in pressure between the inside vapor pressure and the hydrostatic pressure of the oil in which the particle is immersed. Case-hardening can result in the generation of macropores. "Puffing" is the retention of almost the original size and shape of a piece of fruit through the generation of numerous empty pores and macropores inside the particle, giving the finished low-moisture particle a crisp, tender texture. "Low moisture" is a moisture content such that the particle is crisp and stays puffed when brought out into normal atmospheric pressure. Low-moisture puffed fruits contain from about 2% to 5% water. "Oil" designates an edible vegetable oil or fat used herein as a liquid heat transfer medium, and as an ingredient of the puffed, low-moisture fruit products produced by the present invention. Thin slices such as of apple or pineapple of about one millimeter thickness, may contain as much as 20% to 40% of oil in their case-hardened skin pores. Thicker slices of the same fruit or other particles of three to five millimeters thickness will contain only about 15% to 5% oil, which generally does not penetrate far into the interior of the puffed particle. Such oil, when limited, is helpful to improve palatability. However, excessive amounts of oil on the surfaces of the particles is undesirable, and employment of a vacuum centrifuge to remove free oil is resorted to. Minimum amounts of residual oil are retained on thick pieces, such as 12 mm. thick slices of apple, pineapple or banana that dehydrate slowly, but carry only 3% to 15% residual oil after dehydration to about 2% moisture and centrifuging. Biological particles, such as grapes that possess a thick skin covering, consistently pick up less residual oil, and puffed grapes with less than 5% residual oil are readily obtained.

BRIEF DESCRIPTION OF THE DRAWINGS

The above and other objects and advantages of the present invention will become apparent from the following description when read in conjunction with the accompanying drawings wherein:

FIG. 5 is an exploded schematic diagram showing the preferred embodiment of control means for the control of automation of the process and apparatus of FIG. 4;

FIG. 6 is a longitudinal sectional fragmented view of a hydraulic rotary valve device utilized to energize and time the automatic operation of the process and apparatus of the invention;

FIG. 7 is an end view of the valve of FIG. 6.

FIG. 17 is a plan view in section of the apparatus taken generally along line 17—17 of FIG. 15;

FIG. 18 is a plan view of the portion of the apparatus taken on the section line 18—18 of FIG. 15, with a portion broken away;

FIG. 19 is a fragmentary view partially in section, of the inflatable seal of the discharge station of the apparatus of FIG. 15;

FIG. 20 is a longitudinal sectional view of the actuating motor of FIG. 18;

FIG. 25 is a graphical representation of ranges of pressure and temperature under which the process of the present invention may be performed; and FIG. 26 is an exploded schematic diagram showing the operating sequence of the process in which the hydraulic pressure on the bottom layers of fruit is reduced during the last stage of dehydration.

APPARATUS FOR DEHYDRATING NON-FLOATING PARTICLES

There are some fruit, vegetable, and meat particles that will not puff enough to render them buoyant in oil. Carrots, cherries, prunes, and dried chicken are examples; and such fruits and vegetables and meats must be processed in an apparatus such as that of FIG. 2, by the present invention.

Figure 2:
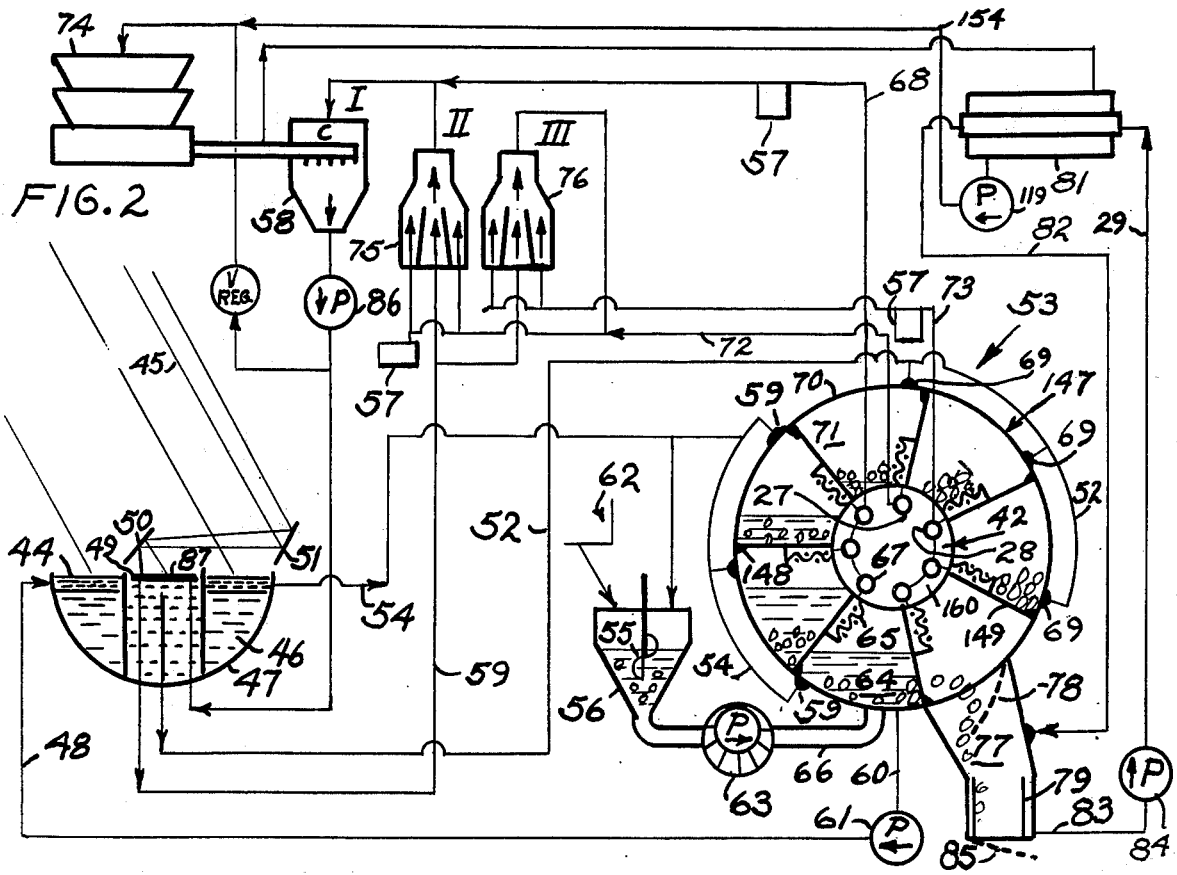
FIG. 2 is a schematic layout of a processing system in accordance with the present invention for carrying out the process of the present invention.

In FIG. 2, a multi-temperature heat source having a base 47 for containing water, a three stage vacuum system generally designated I, II, and III, a heat dispenser or cooling tower 74, and an oil cooler 81 are connected by suitable conduits to the processing apparatus 53 that is capable of processing particles that are difficult to make buoyant in oil. The processor is enclosed in a stationary case 147, and includes a rotary vane assembly comprising vanes 149 that makes zones 71 in which the processing takes place, and are sealed during rotation by sliding seals 148, carry screens 65 through which vapors and oil pass to valve 42, which is a modification of valve 42, FIG. 8. The modification adapts the valve for the horizontal shaft of the processor 147.

The liquid heat transfer medium, layer 44, is skimmed from solar pond water 46 by exit pipe 54 and this heated oil at about 65° C is mixed with wet fruit particles in mixer 55, and hopper 56, as diagrammed in FIG. 2 thereby resulting in the contacting of the particles by the liquid medium. A further portion of the oil from skimmer pipe 54 flows through spray heads 59 to contact the particles that are under initial vacuum treatment in Stage I of the processor and supplies latent heat of vaporization of the moisture of the particles. A major portion of the moisture vapor, and overflowing oil pass into ports 67 of valve 42 and then through conduit 68 to separator 57 where the entrained oil is removed from the vapor. The vapor is condensed in the Stage I condensor 58 that is cooled by a suitable ambient heat-sink, such as water cooler 74. A portion of the oil in the solar pond or other heat source 49 is further heated to about 99° C. The oil may flow into regions of the pond wherein solar rays 45 are concentrated by mirrors 51 and 50 to heat metal heat receptor 87 well above the boiling point of water. The oil, at about 99° C is sprayed into contact with the particles of Stage II and Stage III by flowing through oil spray nozzles 69. Vapor and oil flow into Stage II vacuum system through valve port 27, and vapor and oil flow into Stage III vacuum system through valve ports 28. Conduits 68, 72, and 73 conduct vapors of Stage I, Stage II, and Stage III to condensor 58 and steam jets 75 and 76 respectively. These conduits are arranged with suitable down-hill gradients for gravity flow of oil into oil traps 57, and the separate conduction of vapors into Stage I condensor 58, Stage II steam jet evactor 75, and Stage III steam jet evactor 76, respectively. The mixture of fruit particles and oil is injected at a regulated rate by pump 63 and pipe 66. Excess oil that has been reduced in temperature by contact with fruit particles, is removed from the processor through pipe 60, pump 61, and is returned to the heat source through pipe 48. Small solid particles and other water-soluble impurities that the oil had picked up in processor 53, are removed into the water phase of pond 46, and the oil is reheated. Finished puffed food particles are removed into trap 77 from processor 53 through trap door 78 whose operation will be described in later paragraphs. The particles are cooled by cool oil from oil cooler 81 to harden the puffed structure, and the cool oil is then removed from trap 77 through pipe 83 and pump 84, and returned to the oil cooler through pipe 29. This cooling step may be carried out by spraying the particles with the oil medium. Oil is cooled in oil cooler 81 by cool water from water cooler 74, and the water is returned to the water cooler through conduit 154. At the time when cool oil is being withdrawn from trap 77, a centrifuge 79, whose construction will be explained later, is started and excess oil is thrown off the surfaces of the particles. Then the centrifuge is stopped, trap door 78 is closed, and door 85 is opened, admitting air into the trap without disturbing the processing of particles in other sectors of processor 53. The particles fall out of centrifuge 79 in the finished condition, ready for packaging and trap door 85 is closed. Automatic operation of valves and other devices regulating the above described process will be described, in conjunction with FIGS. 5, 6, and 7, and FIGS. 9 to 12. The sectors 71 which, with the central shaft and valve components 42, comprise the rotating assembly or rotor of processor 53, turn in the clockwise sense, so that particles received in the first stage from pipe 66 are carried around clockwise, subjected to the vacuum of about 90 to 59 torr of Stage I, then to the vacuum of about 45 to 15 torr of Stage II, and finally to the vacuum of about 10 to 3 torr of Stage III with exposure to oil heated at about 55° C to 65° C in Stage I, 65° C to 76° C in Stage II, and 76° C to 99° C in Stage III. Higher or lower temperatures may be used, dependent upon resistance of the particles to temperature. The exposure to heat and vacuum continues until the particles are puffed and substantially dry. Evactor jet 76 is motivated by steam at about 600 torr, and evactor jet 75 receives the compressed water vapor that issues from jet 76 and from conduit 72 and further compresses the mixed vapors with motive steam from steam generator 87 at a pressure of about 2400 torr; and the compressed vapors are delivered into condensor 58 at a pressure of the water vapors suitable for condensation of the vapors by cooling in condensor 58. Condensor 58 is cooled by ambient means: water flowing from water cooling tower 74. The steam generator 87 receives concentrated solar radiation from sun rays 45 which are concentrated by a focusing mirror system, comprising mirrors 51 and 50 and a solar tracking system, suitable examples of which are well known in the art, which moves the mirrors to keep the sun's rays shining upon the surface of steam generator 87.

Flotation Used As a Processing Aid

Fresh fruits and vegetables, whether sliced or whole, will sink when placed in a deep vessel of vegetable oil. But we have found process conditions under which most fruit and vegetable slices, such as of apple, banana, onion, and the like will first sink and will later rise to the surface of an oil bath and float. This combination of actions, initially sinking, then floating has transport advantages that we make use of in the present invention. We have contrived several modifications of apparatus, each useful to put the invention to work under special conditions that will be described.

Figure 4:
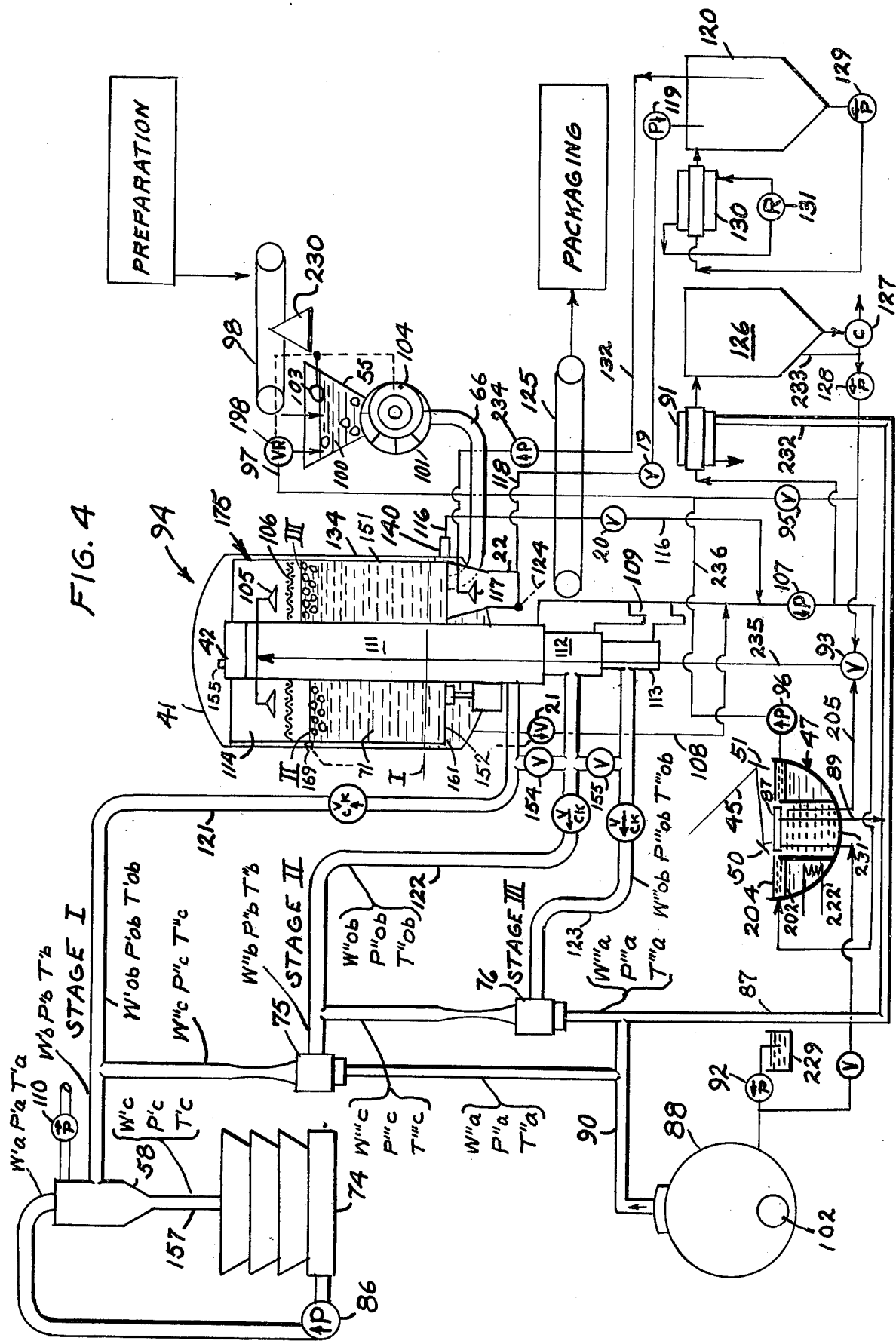
FIG. 4 is a schematic layout of an alternate embodiment of a system in accordance with the present invention.

The illustration of FIG. 4 indicates all of the principal and auxiliary parts, in which a rotary continuous machine 94 receives a procession comprising vegetable oil and wet, sunk particles. The processor removes the major portion of the moisture by evaporation under an initial higher sub-atmospheric pressure, and then removes the minor proportion of the moisture under a lower sub-atmospheric pressure, and higher temperature, and delivers a procession of cooled, puffed, de-oiled, dehydrated particles. The apparatus of FIG. 24 similarly processes a procession of oil and wet sunk particles in a series of separate vacuum chambers, and delivers a procession of cooled, dehydrated, de-oiled, puffed particles. In each form of apparatus, the sunk wet particles are first immersed in oil. A level of oil is maintained over the particles in contact with normal atmosphere. The particles are then moved into the vacuum chamber from a hopper of oil under atmospheric pressure without materially damaging the particles. This is accomplished without admitting atmospheric air to the vacuum chamber, with aid of a device such as a reciprocating piston pump or a rotary vane pump that meters the rate of flow of the mixture, and has chambers and spaces between vanes that are substantially larger than the food particles. Thus when using pump 101 of FIG. 24 for transporting a mixture of oil and apple or pineapple slices measuring approximately 1.6 millimeters thick by 60 millimeters in diameter, the distance between vanes of vane pump 101, and the distance from the rotor to the case, should measure more than 60 millimeters. Although such thin wet slices will not break but will readily bend and conform to the flow of oil in which they are submerged, it is preferred to use a large size, positive displacement pump, and rotate the pump at relatively slow speed. Thus the dynamic forces between flowing oil and particles are small, and delicate submerged fruit particles can be metered out of atmospheric pressure into the vacuum condition of processing chambers 319 and 94, without material breakage of the slices.

Figure 3:
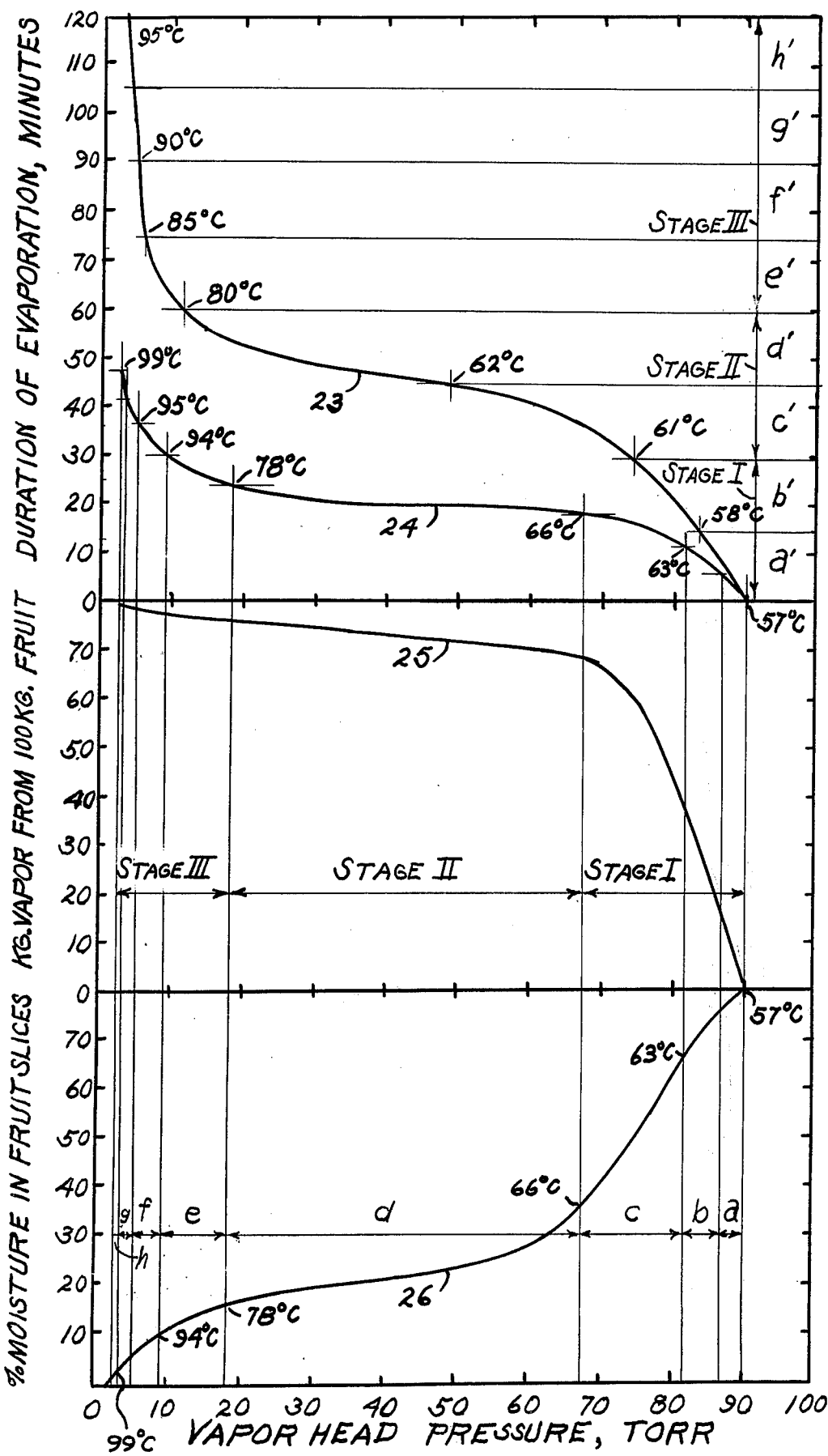
FIG. 3 is a graphical representation of processing conditions for floating fruit particles in accordance with the present invention, relating vapor head pressures to moisture content, moisture evaporated, and duration of treatment in contact with the heated oil, and oil temperatures, for two examples of particle size.

Flotation for fruit particles is generally attained under the conditions set forth in FIG. 3, in which curve 23 generally represents the behavior of fruit slices of about 4 to 7 millimeters thickness, and curve 24 represents the behavior of slices about 1.5 to 2.0 millimeters thick.

A range of minimum oil temperatures and maximum pressures under which the floating condition is attained in wet apple slices and the like, is set forth in FIG. 25, above curve 165.

The submerged particles enter the vacuum chamber through pump 101 and pipe 66. They immediately deliver voluminous bubbles of water vapor that rise above the oil surface and are trapped and condensed in Stage I of the vacuum system. Great turbulence in the oil is caused by the rise of water vapor. This turbulence circulates the fruit particles up and down in the oil bath. Thus until the particles become totally buoyant in the oil, they are subjected to higher and lower pressures, depending on the depth of oil in which they are momentarily submerged. Particles become relatively uniformly distributed in the turbulent conditions and are readily moved or guided by the vertical walls of the container 319 in FIG. 24 or by the confining walls 138 of rotor 175 of FIG. 15. Thus while the major portion of water is evaporating from the slices, they move from one vacuum zone or condition to another without friction or tearing of delicate slices even though the slices of wet fruit be so thin as 1.6 millimeters. This transport property of the particles enables them ultimately to be elevated by their buoyancy to the top layer of oil, and there to be sustained and exposed relatively uniformly, to the lowest vapor head pressure conditions and highest temperatures, to remove a minor portion of moisture and dehydrate the slices to about 2% moisture content.

The particles are automatically guided to move from one pressure zone to another, where the pressure is sub-atmospheric, and is regulated, in each zone or station, by valve 42. The water vapors are seggregated or collected from the first zones, where the major portion of the water of the particles is evaporated, and condensed in a condensor adapted to efficiently condense the higher absolute pressure vapor that is collected in these initial pressure zones, a, b and c. The water vapor that is evaporated in later zones or stations d, e, f, and g of the series, is compressed and condensed separately from the first vapors. Flotation of the particles from one pressure zone to the next is facilitated by guiding vanes or walls 138. When the particles are floating, to form parallel layers at the top of the liquid heat transfer body, the circulation, and heating of the particles to effect evaporation of moisture is easily effected. Heated medium issues from spray nozzles 105 in each of the chambers or zones 71, to pass over the floating particles. Liquid medium that has cooled, falls by convective movement down to the lower levels, and finds its way out through screen 136 and pipe 108.

APPARATUS FOR DEHYDRATING FLOATING PARTICLES

Referring now to FIG. 4, an apparatus is shown in diagramatic form that is suitable for applying the present invention to the dehydration of food particles that will puff and float in vegetable oil. When we maintain conditions of oil temperature and sub-atmospheric pressure in Stage I approximately according to the curve 165 of FIG. 25, fruit and vegetable particles such as sliced apple, sliced onion, and the like, will rapidly form a very thin case-hardened outer layer or skin, and then they will puff and float in oil. The exodus of water vapor from the wet interior is somewhat retarded by the partially dehydrated skin, and macro-pores are blown like bubbles under the skin. The macro-pores are maintained in the enlarged condition so long as water vapor is generated under the skin at a substantially higher pressure than the sub-atmospheric pressure prevailing in the immediate surroundings of the particle. When the particles progress from station to station approximately according to the time, pressure and temperature schedule of curves 23 and 24 of FIG. 3, they remain puffed and floating. This floating condition is relied upon, and floating is essential for the correct performance of the process in the apparatus of FIG. 4, and modifications thereof.

Figures 15, 16:
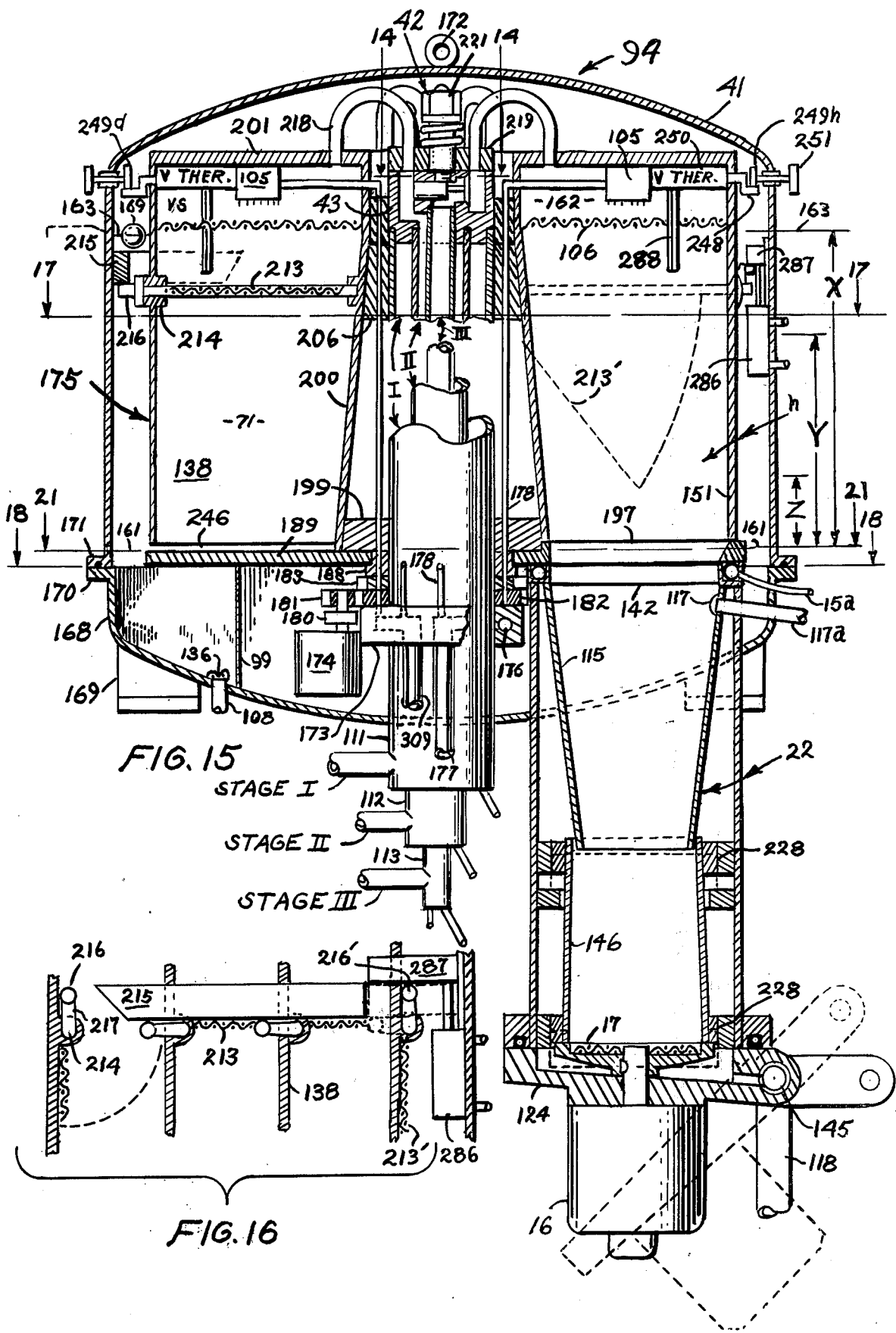
FIG. 15 is an elevational view in section of the preferred form of the vacuum dehydrating apparatus taken generally along line 15—15 of FIG. 8.
FIG. 16 is an exploded detailed view, partially in section, of the operating mechanism of the intermediate screen of the apparatus of FIG. 15.

A suitable apparatus for producing the floating condition in fruit and vegetable particles and then dehydrating the puffed particles, is depicted in detail in FIG. 15. FIG. 5 shows a linear development of the processing stations of an apparatus similar to that of FIG. 15, and FIG. 26 shows an alternate development.

The machine comprises a central core or tube 111 inside vacuum tight case 41. Surmounting the central core 111 is a valve 42 that distributes the vapors arising from dehydration into the separate vacuum stages. Stage I conduit 111 receives the initial vapors at the highest absolute pressure of about 50–100 torr. Stage II conduit 112, which is concentric to conduit 111, and is placed inside of it, receives the intermediate vapors of dehydration at about 20–50 torr. Stage III conduit 113 which is inside conduit 112 receives the last vapors to be given off by the nearly completely dehydrated food particles at about 3–10 torr.

A hemispherical base 168 is mounted upon foundation footings 169, shown in FIG. 15. At the center of base 168 column 111 is mounted to extend vertically up the processor to furnish support for rotor 175. Base 168 has a flange 170 that matches flange 171 of vacuum dome 41. A steel ring 172 is welded to the top of dome 41 to enable the dome to be lifted clear of the internal parts of the dehydrator for inspection and cleaning. Attached to column 111 at a low level inside base 168 is an annular collar 173 that contains an internal oil distributing manifold 176 for distributing portions of the liquid heat transfer medium. The medium is received from conduit 177 into distributor 176, thence the medium passes through conduits 178 and sprays out spray nozzles 105 which are inside the vapor heads 162 above screen 106. Drive motor 174 is mounted on collar 173 to drive clutch 180, pinion 181 and rotor drive gear 182. A ratchet mechanism is arranged, with ratchet wheel 183 attached to gear 182 and collars 188, and 199, all mounted to rotate with gear 182 upon tube 111, which is stationary. As shown in FIG. 18, the ratchet mechanism comprises ratchet wheel 183, and pawl 184. Pawl 184 is pivoted on pivot 285 attached to base 168. Motion of pawl 184 is controlled by a hydraulic linear motor 186 so that a forward thrust by the motor on its piston rod 187 drives pawl 184 into the detent position stopping rotation of ratchet wheel 183, and a backward thrust withdraws engagement of the pawl permitting motion of the ratchet wheel. Thus, when motor 174 is energized, the pinion 181 rotates clockwise to turn gear 182 and ratchet wheel 183 counter-clockwise. But in and out movement of piston 187 under control of the automatic timing device described later, causes pawl 184 to engage and disengage the ratchet wheel and to permit the wheel to rotate only to the extent of one notch of the ratchet wheel for each in and out motion of the pawl. Thus rotor 175 advances counter-clockwise by 45°, or the angular spacing of one station for each complete back and forth movement of piston rod 187.

A collar 188 is mounted upon ratchet wheel 183 to provide a bearing for the rotation of shutter 189. Shutter 189 is reciprocated in limited rotation by action of linear motor 190, FIG. 18, that is pivoted at pivot pin 185 on base 168. Linear motor 190 drives piston rod 191 and pivot 192 in timed reciprocating motion between positions 192 and 912′ of FIG. 18. Pivot pin 192 is attached to the underneath surface of shutter 189; and under impulse of motor 190, pivot pin 192 causes shutter 189 and tab 197 to reciprocate between two positions, the position that it has in FIG. 17, and the position after 45° clockwise rotation.

Shutter 189 is made from a flat circular steel disc from which a first aperture 193 of 90° opening has been cut, leaving a narrow rim 194; and a second aperture 195 is cut out leaving the rim 196 shown in section in FIG. 19. Between apertures 193 and 195, is a tab of steel 197. In the position shown in FIG. 17, tab 197 covers exit chamber or discharge trap 22. When motor 190 causes shutter 189 to rotate counter-clockwise a full stroke, or 45°, tab 197 will advance to leave exit chamber 22 uncovered.

Rotor 175 may be divided into any convenient number of sectors, which are defined by radial partitions 138 that are sealed to conical sleeve 200 to define the inner boundary of each sector. Partitions 138 are sealed at the top to disc 201, defining the top boundary, and are sealed to the cylindrical wall 151 of rotor case 175, defining the periphery of each sector. The sectors are open on the bottom, level 161 and oil may circulate at this level from one sector to another, flow being restricted only by a small gap that necessarily exists between shutter disc 189 and the bottom edges of partitions 138. This small gap permits relative movement between the shutter and the rotor, and the flow of oil between sectors.

At the top portion of each sector, two screens may be arranged. Screen 106 is the highest screen and is permanently fixed in each sector to define a vapor head space 162, beneath disc 201 and above the screen 106. Screen 213, placed below screen 106, swings on pivot 214, and may be raised or lowered by action of cam 215 on crank pin 216, moving thereby from its horizontal position, defined by solid lines in FIG. 15 to the vertical position 213′, defined by dotted lines. FIG. 16 is an exploded view through case 151; it shows in detail the mechanism for raising and lowering screen 213. A cam 215 is attached to extend horizontally inside a selected portion of the case 41; with motion of the rotor toward the right, crank pins 216 strike cam 215 which forces the crank 217 downward 90°, thereby rotating screen 213 to swing upward on pivots 214. With screen 213 in the raised, or horizontal position, a space, or processing zone is defined at the upper level of the oil, below screen 106, and floating particles may be retained therein until the screen swings downward again and the oil level drops. The top disc 201 is pierced by a tube 218 over each sector that forms a conduit for vapor to flow from vapor head 162 into valve 42. The inner end of each tube is attached to valve cap 219. Valve cap 219 is constrained to rotate with rotor 175 by torque arm 220, seen in FIG. 8. A suitable pin, nut, washer, and spring assembly 221 is attached to valve 42, and serves to press valve cap 219 firmly against the upper surface of the valve body 43, to form a vapor-tight rotating seal. Thus, when the rotor assembly 175 turns, tubes 218 conduct vapors from the sectors to the various valve ports in valve body 43. Tubes 218 may be of flexible material.

Figure 13:
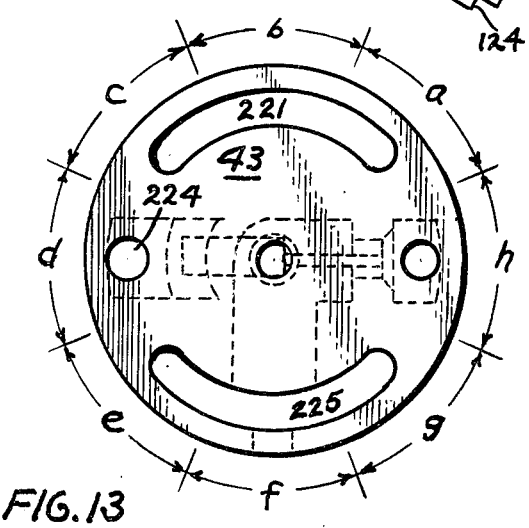
FIG. 13 is a plan view of a valve element 43 of the preferred form of valve 42 in FIG. 15.
Figure 14:
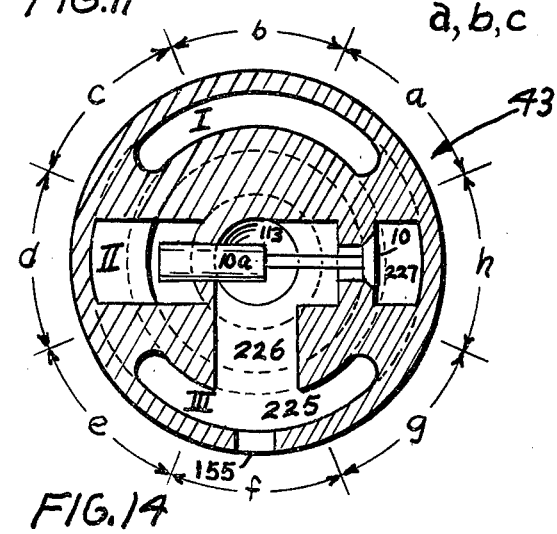
FIG. 14 is a view of the valve element of FIG. 13 taken on the section line 14—14 of FIG. 15.

Valve 42 functions to conduct vapors from sectors 1 to 8 into selected vacuum Stages I, II, and III, depending upon the momentary position of the sectors with respect to the valve openings. Thus in FIG. 8, at the momenet of rotation shown, sectors 5, 6, and 7 are stopped over stations $a$, $b$, and $c$, respectively; and vapors from these sectors are guided by valve 42 to enter valve cap port 221 of FIGS. 13 and 14, which is in alignment with the annular Stage I conduit inside column 111. Similarly, sector 8 is stopped above station $d$, and vapors from sector 8, during the period at station $d$, pass through valve port 224 into Stage II vacuum system by way of the annular space between columns 112 and 113. At this moment, Sectors 1, 2, and 3 are stopped over stations $e$, $f$, and $g$, respectively and the vapors from the latter sectors pass through valve port 225, thence through internal valve port 226 to reach Stage III conduit 113. Sector 4 at the same moment rests above station $h$, which is the last station at which dehydration takes place. Station $h$ is also the exit station from which the finished food particles are removed from the dehydrator. To facilitate exit of particles, and also to control the flow of vapors, preventing undesirable surges of pressure in Stage III, a valve 10 has been arranged in the vapor outflow port of station $h$. Valve 10 is opened and shut by linear motor 10a, which is controlled by flow of hydraulic fluid through automatic control valves 10b and 10c of FIG. 5 in the manner which will be described in a later paragraph.

It is to be noted that a port 155 in valve body 43 connects Stage III vacuum system with the vacuum region immediately over rotor 175 and under case 41. This connection maintains the sub-atmospheric pressure inside case 41 at the same pressure as exists in pipe connection 113 of Stage III vacuum system.

A preferred form of the discharge, or finishing station $h$ is illustrated in detail in the sectional view of FIG. 15. The view indicates that screen 213 is in the dependent or open position 213', crank pin 216 having run past the limit of extension of cam 215. With tab 197 withdrawn from the closed position, the contents of sector 4 fall into trap 22, which is shaped by funnel 115 to guide the particles into centrifuge bowl 146.

The centrifuge is a combination vacuum release trap and de-oiler. A motor 16 with vertical shaft is mounted on bottom trap door 124 which swings about pivot 145 to open the trap and discharge the centrifuge bowl contents. The bowl 146 may be non-perforated, and preferably of a slightly conical shape, with greater diameter at the bottom to facilitate discharge of bowl contents through the open trap door. Upper and lower bearings for the bowl 228 admit to bowl rotation speeds to attain centrifugal forces on contained food particles in the range 100 to 300 times normal gravitational force, depending on the requirements of the product for effective de-oiling. Oil thrown off the product collects on the inner circumference of bowl 146 and runs down, passing through screen 17 to the hollow pivot 145, from which the oil drains into pipe 118.

When screen 213 is raised by action of cam 215 on crank 217, the screen traps all the charge of floating food particles in the space between the two screens 213 and 106. This action, taken at the end of Stage II at station $d$, occurs while the particles are firmly buoyant, and are still evolving water vapor at a rapid rate. Later, during Stage III, evolution of water vapor slows down. Should any particle be carried by a convection current of oil to a low level in a sector, the macropores might collapse, and the particle would sink, and not become fully dehydrated, for the higher hydrostatic pressure of the deep oil would inhibit generation of water vapor. This phenomenon occurs most strongly among stray particles that have already lost the major portion of their water vapor. Hence the raising of screen 213 serves to confine all particles in the higher region or zone where dehydration is less hindered by hydrostatic pressure of the liquid heat transfer medium.

Figure 24:
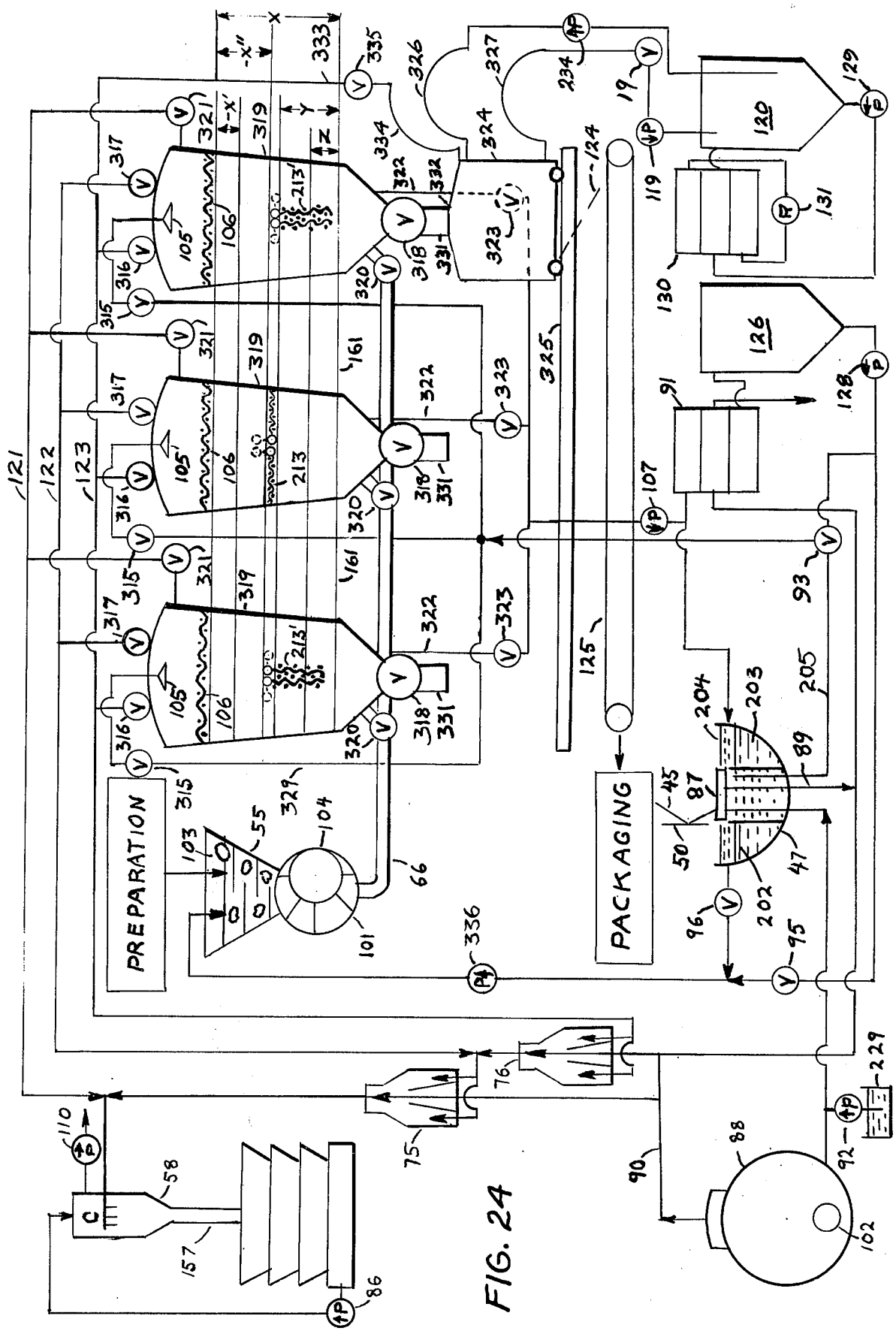
FIG. 24 is a schematic representation of another embodiment of the apparatus for carrying out the present invention on floating particles.

An alternative form of apparatus for floating particles is depicted in FIG. 24.

The machine comprises three or more vacuum tight containers 319, each surmounted by a valve 316, 317, and 321, which conduct water vapors through conduits 123, 122, and 121 respectively. The containers 319 are charged with particles and heated oil fed by pump 101 through pipe 66 to each valve 320. Particles from the Preparation area are mixed with oil and fed into pump 101 through hopper 55. Each container 319 is charged in its turn and filled to line 161 at the start of Stage I for that container. When one container 319 is being filled or is in some part of Stage I, the next container is in a Stage II condition and the third still more advanced is in Stage III or is being emptied into centrifuge 324.

Sprayer 105, regulated by valve 315 of each container 319 provides additional heated oil through pipe 205 at about 100° C from solar pond 47 or oil heater 91. Three-way valve 93 controls the source of the heated oil, originating at oil heater 91 or solar pond 47. Sprayer 105 provides the heated oil necessary to replace heat lost through vaporization of moisture in particles dehydrated in containers 319.

Hopper 55 is also supplied with heated oil from solar pond 47 and oil heater 91. Pump 336 delivers heated oil to hopper 55, while atmospheric pressure delivers oil through sprayer 105 into containers 319 when partial vacuums are achieved therein during Stage I through Stage III. Boiler 88 provides steam to heat oil in heat exchanger 91. Solar rays focused by mirror 50 heat plate 87 which heats oil at the surface of solar pond 47. A pipe coil in plate 87 also generates steam for nozzles 75 and 76.

At Stage I in each container 319, the particle and oil level is maintained near level 161. Additional heated oil is introduced by sprayer 105 to raise the temperature of the particles and oil already in each container 319. This raises the level of oil distance $z$ during Stage I. Screen 213 is positioned in the open configuration designated 213' during Stage I through Stage II. Floating particles rise with the level of oil above screen 213 when it is in the open position 213'. When the oil level is brought up to screen 106, or thereabouts, Stage III is initiated. Floating particles are restrained by screen 106 from entering valves 316, 317 and 321.

Condensor 58 provides a vacuum of about 30–50 torr to condense vapors conducted from each container 319 during Stage I. Vacuum pump 110 removes air trapped in the system. At the end of Stage I, valve 321 is closed, valve 316 remains closed, and valve 317 is opened, allowing vapors to be conducted to steam evactor 75. At the end of Stage II, Stage III is initiated by closing valve 317 and opening valve 316, allowing vapors to be conducted to steam evactor 76. Stage I conduit 121 receives the initial vapors at the highest absolute pressure of about 50–100 torr. Stage II conduit 122 receives the intermediate vapors of dehydration at about 20–50 torr. Stage III conduit 123 receives the last vapors to be given off by the nearly completely dehydrated food particles at about 3 torr.

Before the end of Stage III, when oil and particle level is at screen 106, the level is brought down a distance $-x'$, approaching screen 213, which is in the horizontal position 213' underneath the floating particles. As the oil level is brought still further down, a distance $-x''$, the particles are suspended on screen 213. Consequently all particles previously held beneath the surface of the oil by overlying layers of particles, are directly exposed to the vacuum conditions of Stage III and uniformly dehydrated. Oil is removed from each container 319 by opening each valve 323 which allows hot oil to drain through conduit 322, pumped by pump 107 into sump 126.

When each container 319 is drained of all hot oil at the end of its Stage III phase, and the particles contained therein are sufficiently dehydrated, it is connected with centrifuge 324 at vacuum tight joint 332. Screen 213 is closed to the 213' position at the end of Stage III after hot oil has been pumped out of the container 319. Particles fall from the space above screen 213 through valve 318 which is opened to discharge into centrifuge 324.

Pump 234 pumps cool oil from sump 120 into centrifuge 324 through flexible hose 326. Pump 119 pumps oil back to sump 120 through valve 19 when particles in centrifuge 324 are sufficiently cooled. Sump 120 is maintained with cool oil from heat exchanger 130, cooled by refrigerator 131. Pump 129 circulates oil through heat exchanger 130.

After being cooled by oil from sump 120, the particles are centrifuged and de-oiled in centrifuge 324, still at a vacuum of about 3 torr. After the particles are sufficiently de-oiled, trap door 124 is opened, exposing the particles to the atmosphere and unloading them onto belt 125, where they are conducted to the Packaging area. Centrifuge 324 is wheeled to a different container 319 after discharging its contents and is disconnected at joint 332. At the different container 319 it is loaded with hot, dehydrated particles as previously described. In this way a fairly constant flow of particles is maintained into the Packaging area, and all containers 319 are operated in a Stage I through Stage III zone, or are either loading or unloading particles, there being no long periods of idleness for any of the containers 319.

At the beginning, the particles are subjected to the dehydration conditions of Stage I vacuum zone. They are puffed by the rapid evaporation of moisture in this zone, and the particles float. The conditions continue to evaporate the major portion of moisture of the particles; then the floating particles are subjected to the lower pressure conditions of Stage II vacuum zone and higher temperature of heat transfer medium to evaporate a minor portion of moisture of the particles. At last, the particles are nearly completely dehydrated by subjecting them to still lower pressure of Stage III zone and still higher medium temperature.

It is clear that the apparatus of FIG. 24 is capable of carrying out all of the processing steps that are described as being performed by the apparatus of FIG. 4. The apparatus of FIG. 24 may be preferred in manufacturing fruit chips in instances where simplicity and accessibility to the interior of one vaccum compartment for cleaning and inspection may be necessary without interfering with the processing operations that may be going on in other vacuum compartments.

On the other hand, the apparatus of FIG. 4, with the modifications of FIGS. 21, 22, 23 and 26 is preferred in manufacturing floating fruit and vegetable particles where automatic operation and a very high through-put rate are required.

The more simple form of the apparatus of FIG. 4, in which no lower screen 213 is provided, as in FIGS. 9 to 12, has an advantage where it is not necessary to produce a product that is uniformly dehydrated to the maximum dryness of, say, 2% moisture content, but a higher average dryness is satisfactory. In such an instance, the top layer floating on the liquid heat transfer medium might be dehydrated to about 2% moisture content, and the lowest level of particles that are well beneath the liquid surface, may only reach about 8% moisture content. Then when these two layers of particles of different moisture content are packed together in the same air-tight container for storage and shipment, natural diffusion of moisture vapor will occur within the container to equalize the moisture content of all particles at, approximately 5% moisture content, which would be satisfactory for that particular purpose.

Figures 9, 10, 11, 12:
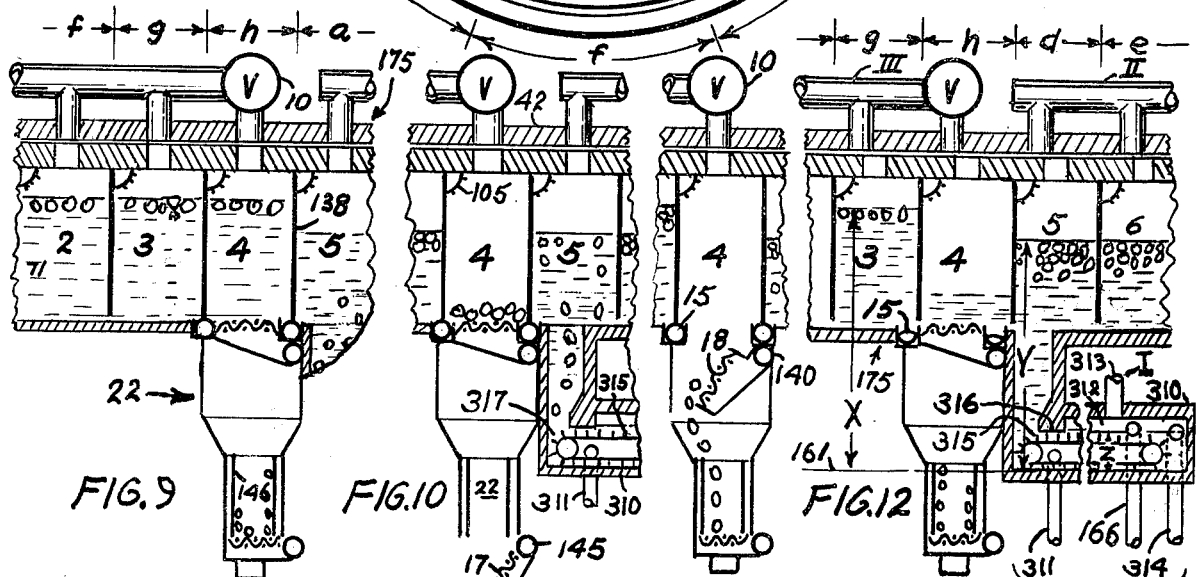
FIGS. 9–12 are schematic illustrations of the stages of operation of the discharge station and adjacent stations of the system of FIG. 5.

When very high throughput rates are required, as in some of the examples cited, the flow of heated oil through Stage I is very high. Then it is preferred to employ a separate unit 310, such as shown in FIGS. 10 and 12, to dehydrate the entering particles. A relatively large vessel 310 receives heated liquid heat transfer medium from pipe 311, and maintains a vapor space 312 above the liquid level, with vapor exiting through pipe 313 into Stage I vacuum system, and the liquid medium being withdrawn at the liquid level through pipe 314. The mixture of prepared fruit or other slices from hopper 55 of FIG. 4 is fed into pipe 166 by pump 101, and thence into one end of vessel 310. The food particles progress from the entrance end of vessel 310 to the exit end into Stage II, and during that movement, the dehydration previously described for stations $a$, $b$ and $c$ takes place. To facilitate movement of the particles, it is preferred to provide a conveyor, such as a spiral or belt conveyor. In FIGS. 10 and 12, a belt conveyor with vertical lugs 315 is shown. The pockets between lugs 315 are arranged in conjunction with sidewall baffles to confine the particles while transporting them and subjecting them to contact with the liquid medium. A gate 316 is provided at the liquid level, and immediately above the lugs 315 at the exit end, to exclude escape of vapors from vapor space 312 into Stage II, while not preventing the passage of floating particles in the pockets that pass beneath. The food particles become partially dehydrated by losing the major portion of their moisture by passing in contact with heated oil from the entrance point to the exit point of unit 310, and when they reach gate 316 and are discharged into station d, they are floating; their buoyancy causes the particles to rise to the top of liquid level in the sector of rotor 175 that may be standing immediately over the discharge of gate 316. The dimensions of unit 310 are such that the liquid level of vapor space 312 stands a distance Z above the bottom of unit 310; and the level of liquid in the sector of Stage II into which gate 316 discharges the floating particles, stands a distance Y above the bottom of unit 316; and the level of liquid elsewhere, where the sectors are in Stage III vacuum condition, stands a distance X above the bottom of unit 310. These liquid levels are automatically assured by the relatively static hydraulic and vapor head forces. The levels are indicated in FIG. 12.

The provision of separate space for the carrying out of the major portion of the dehydration which occurs in Stage I, has the distinct advantage of permitting the flow of the quantity of heat transfer fluid, and the volume of water vapor which are associated with the major evaporative operation that occurs in the first stage. These flow rates are of an order of magnitude higher than the corresponding flow rates of the succeeding stages, as is attested by the data presented in Table 7. Apparatus dimensions must be correspondingly greater, and the separation of Stage I from Stages II and III is physically necessary, and by the separation, engineering problems are easily solved, making large-scale vacuum dehydration by our process feasible.

Baffles on the sides of conveyor 317, FIG. 10, make a rubbing seal with lugs 315; and the baffles, being essentially stationary plates materially prevent escape of vapors from vapor space 312 into Stage II; and therefore substantially all of the vapor that is generated inside of unit 310 is guided to be exhausted from that space through pipe 313, while the liquid level is maintained by overflow pipe 314 at closely to the top of lugs 315. The passage of the belt carrying lugs 315 through gate 316 takes place with escape of very minor quantities of water vapor from vapor space 312 into Stage II vacuum system.

Apparatus for Evaporation of Last Portions of Moisture

During the earlier stages of dehydration, when the fruit particles were carried up and down by convection currents, and there was much water in the particles, evolution of vapor continued regardless of elevation of the particle in the liquid medium. On the other hand, any liquid level above a fruit particle exerts an appreciable inhibiting effect in the last stage of dehydration. Owing to the relatively feeble rate of generation of water vapor during the last stage of dehydration, when the fruit has about 10% to 6% moisture, or less, the vapor pressure of fruit particles is only five or six torr. This last stage must be carried out at the lowest feasible vaporhead pressure, for example about three or four torr. Owing to the fifteen-fold ratio of density of mercury to vegetable oil, it follows that submergence of a particle a distance of 1.5 centimeters beneath the oil surface increases the pressure on the particle by one torr. This hydrostatic pressure is in addition to the vapor head pressure above the liquid surface. Therefore, if the vapor head pressure of the sectors in Stage III is three torr, submergence of a particle a distance of only three or four centimeters beneath the oil surface is sufficient to produce a total pressure on that particle of from five to six torr, and therefore further dehydration of the more deeply submerged particle will stop. Such a particle might be discharged from the apparatus with about 6% of moisture content, whereas the particle lying above it will become more dehydrated, and the particles close beneath the surface of the liquid heat transfer medium may be reduced to about 2% moisture.

The apparatus of FIG. 24 avoids the difficulty by hoisting screens 213 underneath the floating particles to give them support, while the oil level is at X, and the particles are substantially beneath this level, and then lowering the oil level, first the distance $-x'$ and later the distance $-x''$. During this stage, convective movement of the particles has stopped. The particles have become fixed in intermeshed horizontal layers. Dehydration with vapor head pressure of about 3 torr, and oil temperature above 90° C, proceeds at levels close beneath the surface of the oil until the moisture content of those particles is about 2%. Hot oil is continuously added from spray nozzle 105 to evaporate the remnants of moisture as the deeper layers of particles are subjected to lower hydrostatic pressure during the period of time when the oil level is being lowered. Before the oil level has receeded to uncover screen 213, the lowest level of particles has had the opportunity to become dehydrated to about 2% moisture content. This principle is also applied to the rotary apparatus of FIG. 15. A modification of the compact rotary apparatus, that effectively removes the liquid heat transfer medium from the particles that are in deeper layers on screen 213 is depicted in FIGS. 21, 22, 23, and 26. Thus advantages of continuous, automatic operation, inherent in the rotary principle of operation are secured, together with means for evaporation of the last portions of moisture.

Figure 8:
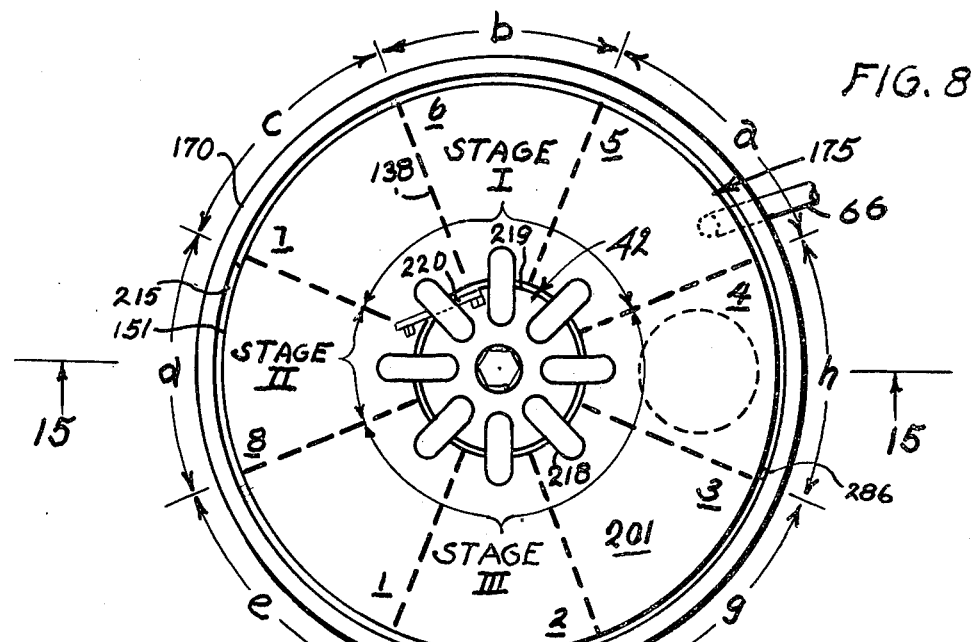
FIG. 8 is a plan view of the preferred form of the processing vessel of FIG. 15, with dome removed.
Figure 21:
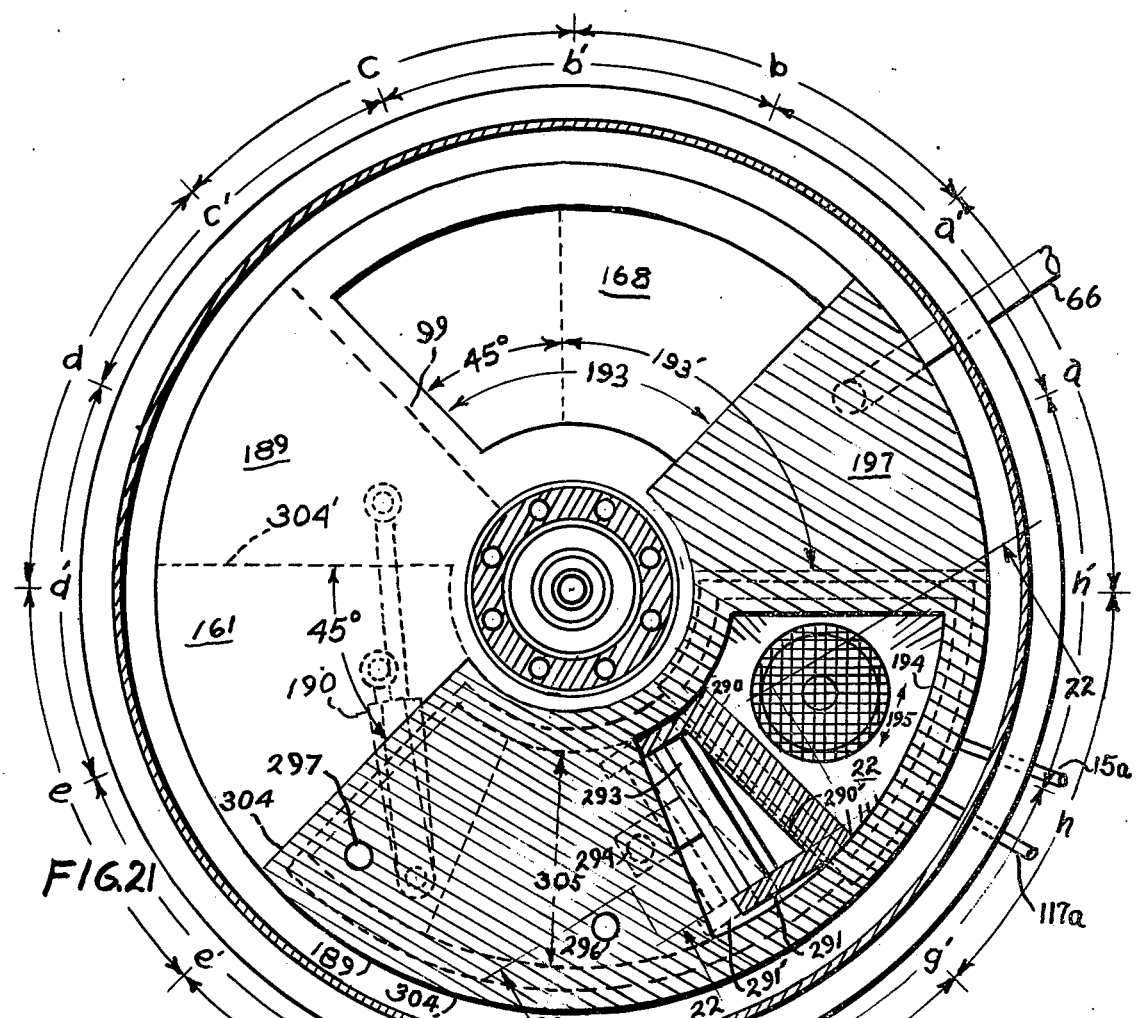
FIG. 21 is a plan view of the apparatus of FIG. 15, taken generally along line 21—21 showing an alternate construction for the discharge shutter 189.
Figures 22, 23:
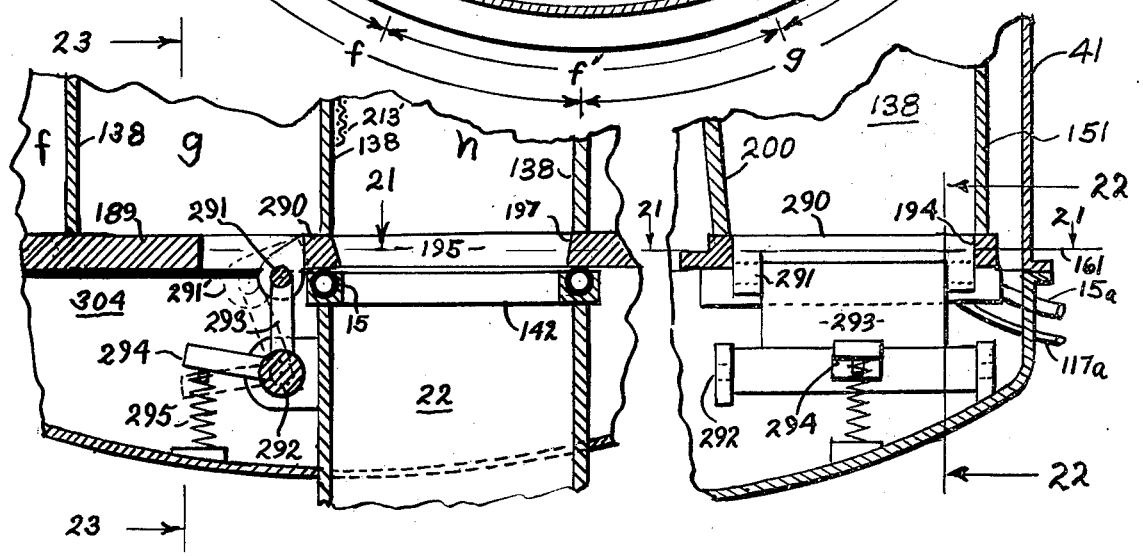
FIG. 22 is a fragmentary sectional view of the shutter mechanism of discharge station h, taken generally along line 22—22 of FIG. 21.
FIG. 23 is a fragmentary sectional view, taken generally along line 23—23 of FIG. 21, of the discharge station h.

Referring now to FIG. 21, a two-level shutter 189 is shown that has been sectioned along the line 21—21 of FIG. 15, for the purposes of illustration. The location of the removed upper level of the shutter is indicated by cross-hatching in FIG. 21. The shutter is rotated in timed reciprocal motion by action of linear motor 190, between the two positions 45° of rotation apart, as indicated by the dotted limit lines of FIG. 21. The shutter has aperture 193, normally over stations a and b, through which the fresh charge can freely circulate from inlet pipe 66 to the top of the liquid level in the sectors that are in Stage I. Counter-clockwise from aperture 193 is a level of the shutter 161 normally underneath stations c and d; and level 161 is slightly lower than the bottoms of rotor skirts 138. This portion of shutter 189 allows a gap 246 to exist as shown in FIG. 15, through which liquid can circulate and permit liquid in sectors over stations d and e to assume levels in substantial static equilibrium with the liquid that stands in the annular space between rotor 175 and case 41. At the same time the range of downward circulation of particles is limited by the presence of shutter 189. The probability of the particles becoming trapped and deflated in the lower regions of base 168 is eliminated by baffle 99 and shutter 189, which define a region under stations d and e that is isolated. In FIG. 8, eight stations are defined by the eight stops a to h which are possible for ratchet wheel 183 and pawl detent 184. In the modification of FIG. 21, which permits control of the liquid level in the last stages of dehydration, sixteen stop positions of rotor 175, $a$, $a'$, to $h$, $h'$ are provided for. The added stops are necessary to effect liquid level control in zones above stations $f$, $g$, and $h$. The stops are induced by constructing sixteen instead of eight points on ratchet wheel 183. The stop period can be half as long, when sixteen stops are used, thereby preserving the original drying period. Although the space under shutter 189 at stations $f$ and $g$ can be reached by liquid circulating deeply through aperture 195, nevertheless, loss of particles by downward circulation in this space is effectively prevented by the raising of screen 213, which occurs at station $d$, and which traps all particles when they are strongly floating under dehydrating conditions of Stage II. When a sector is standing over station $e$, it is in hydraulic communication with preceeding sectors through orifice 297, or gap 246, depending on shutter position. But when a sector has moved over station $e'$ as shown in FIG. 26, the elevated level of shutter 189 closes gap 246. Station $e'$ is isolated with aid of baffle 304 and independent hydraulic pressure can exist in station $e'$ controlled only by constant pressure valve 252, acting through pipe 302 and orifice 296 or orifice 297. Thus valve 252 is adjusted to reduce the hydraulic pressure at the level of screen 213, and so reduce the pressure on particles so that evaporation of moisture can continue. A pipe connection 308 brings to valves 252 and 253 a reference to the pressure of vapor in Stage III, facilitating regulation.

The distance X is the distance from the base level 161 to the surface of the liquid. When the sector stood over station $e'$, pump 306, acting through control valve 252, reduced the oil level of the sector from level X to the level $-x'$. When shutter 189 is in its counter-clockwise position as shown in FIG. 21, the pressure control of valve 252 is exercised through orifice 297 in shutter 189. Also, when shutter 189 is in the opposite position, its clockwise position, shown by the solid lines of FIG. 26, then pressure control valve 252 exercises control over the level of liquid in the sector over station $e'$ through orifice 296. When rotor 175 moves the sector from station $e'$ to station $f$, the liquid level becomes controlled by constant pressure valve 253, acting through pipe 303 to regulate the pressure in isolated region 305, and the level of liquid above screen 213 is then reduced from $-x'$ to $-x''$, exposing the deepest layers of particles to conditions of reduced hydraulic pressure and increased temperature of oil from hot oil spray 105, thereby inducing evaporation of all but about 2% moisture from particles.

The reciprocation of shutter 189 is timed so that tab 197 uncovers trap 22 and trap 22 is utilized for cooling, de-oiling and discharge after the manner of the timing of the actions in Table 2. Screen 213$h$ is lowered to release dehydrated contents through opened aperture 195 by timed action of linear motor 286 raising cam 287 so that crank 217 assumes position 216' as in FIG. 16. Then the dehydrated contents of station $h$ fall into cooled oil of trap 22, tab 197 then closes aperture 195 by clockwise rotation of shutter 189, O-ring 15 inflates to make an air-tight seal underneath closed tab 197, and the centrifuge 146 de-oils the newly injected contents, then air is admitted to trap 22 which does not leak into vacuum portions of rotor 175, and trap door 124 is opened to discharge the finished puffed particles.

During the interval of time when the contents of the sector that is standing over station $h$ are under reduced hydrostatic pressure, and tab 197 is being rotated counter-clockwise so that trap 22 can be exposed, the possible flow of hot oil from station *g* into station *h* is avoided by the automatic insertion of plug 290 as in FIG. 21, into the gap beneath skirt 138 and over O-ring 15. Plug 290 is mounted on lever arms that are pivoted on pivot shafts 291. Pivot shafts 291 are located on the upper extremity of a lever 293 that swings on bearings 292. A spring 295 acts through arm 294 to induce clockwise rotation of lever 293 and thereby to thrust plug 290 forward into the gap whenever the left-hand edge of tab 197 retreats rightward, as in FIG. 22. Return of tab 197 on completion of the discharge phase of station *h*, forces plug 290 to move to the left, into the position shown by the dotted outline 291', and then tab 197 solidly covers the aperture over trap 22, making an airtight seal when O-ring 15 is inflated. Trap 22 then has the contents of station *h*, and the contents are further cooled, centrifuged and discharged.

The timing may be arranged to permit cooling of the dehydrated particles during the period of time when a sector is standing at station *h*, over trap 22 and before screen 213 is lowered. To do this, tab 197 is first moved counter-clockwise to open the way to trap 22. Then hot oil is pumped out of trap 22 by reverse flow through spray nozzle 117. Then cool oil is passed through spray nozzle 105*h* to spray over and cool the particles standing on screen 213*h*. Then screen 213*h* is lowered and the cool particles pour from it into trap 22. Then tab 197 is returned to cover trap 22. Rotor 175 is then moved two steps to bring another dehydrated charge into station *h*, and simultaneously, the centrifuge goes through its cycle as noted in the previous paragraph.

The nozzles 105 can be used to transmit hot oil, or cool oil, depending on the phase in which the sector is passing. Referring to FIG. 15, a pipe 309 may conduct hot oil into a selected nozzle or group of nozzles, and another pipe 177 may conduct a separate stream of oil, at a different temperature into other nozzles. The manifold 176 inside collar 173 can act as a distributing valve, enabling several oil streams to be passed in turn to each of valves 105. Thus when a nozzle 105 is over stations *a*, *b*, and *c*, the temperature of the oil fed to that nozzle may be about 50°–70° C. When the nozzle passes over station *d*, the oil may be at about 75° C, and when it passes over stations *f* and *g*, the oil may be at about 90°–99° C. If cooling over station *h* is desired, then a special line is used to conduct cool oil at about 20°–25° C to the nozzle 105*h*.

Temperature controllers 251 are provided that enable the operator to regulate the flow of oil into the vapor head and establish a desired temperature of oil underneath screen 106. A thermostatic valve 288 controls the rate of oil velocity flow through each spray nozzle 105. Thus if the temperature of the oil bath is lower than the set temperature, the thermostatic valve will open to admit more oil. If the temperature of the oil bath should be higher than what is set at a particular station, the thermostatic valve will reduce the rate of oil flow, and cooling of evaporating particles will reduce the temperature of the oil bath. One controller 251 is placed at each station, and it acts through a suitable cam and crank connection indicated in FIG. 15 to adjust thermo regulator valve 288 to react to the desired temperature of oil bath at that station. In general, the oil fed to valve 288 should be somewhat higher than the desired oil bath temperature. Thus it is possible to automatically reproduce the pressures and the oil bath temperatures required by the curves of FIGS. 3 and 25.

AUTOMATIC CONTROL

Automatic devices that are specified herein and which are already well known, will not be described in detail, but their manner of use will be set forth so that a person skilled in the art may apply such devices where they are needed. For example, boiler 88 of FIG. 4 is arranged with automatic controls, and when the boiler is set into operation, it will feed steam under set pressure into line 90 whenever the source of solar heat fails. The solar heater, with its mirrors is arranged to track the sun by automatic clockwork, or similar well-known and suitable means. Temperatures of oil flowing into the various oil entry points of the processor are stabilized at desired levels by installation of thermostatic valves of well-known construction, that mix two streams of oil of higher and lower temperature to deliver an oil stream of a set temperature intermediate between the temperature of the hotter and the cooler oil streams. The various sub-atmospheric pressure conditions specified as desirable in Stages I, II and III, are readily secured by correct engineering design of condensor 58, evactor jets 75 and 76, and optimum sizing of the various connecting pipes and the valve ports of valve 42.

In general, should the pressure rise above a tolerable limit in any part of any one of the vacuum stages, this will be an indication of overloading and generation of excessive quantities of water vapor. Overloading is cured by continuing the operation of the vacuum systems and the oil heating systems, and by slowing down, or momentarily stopping the input of wet feed material into Stage I. Automatic electric controls can be arranged in the input lines of Stages I, II, and III so that rise of pressure in any one of these lines above a set desired pressure as set forth in later paragraphs, will slow or stop feed motor 63 of FIG. 2, or feed pump motor 104 of FIG. 4. Simultaneously with the stopping or slowing of the feed motor, the flow of oil and wet slices from the preparation room must be slowed or stopped, and normal rates resumed when vacuum conditions have returned to normal. In addition to the above safeguards against overloading, the rate of turning of the rotor assembly of the processor may be slowed or stopped momentarily. Slowing or stopping all components of the apparatus including the delivery of wet food particles, while continuing the operation of the vacuum system and continuing the uninterrupted flow of heated heat transfer fluid, is an effective way to cure a temporary overload condition that may have caused an undesired increase in vapor pressure in any component of the system. After such a stoppage, dehydration continues and the excess water vapor which had been overloading the vacuum system will be absorbed. Then the faulty pressure condition will return to normal. The opportunity should be taken to adjust the feed rate of wet particles to a uniform rate of delivery into the dehydrator of such quantities as will not give rise to excessive generation of water vapor and the overloading of any vacuum component.

With a constant rate of inflow of hot oil, and a variable outflow through valve 21, the level of liquid heat transfer fluid, or vegetable oil, is set at level 163 by action of floating level controller 169, depicted in FIGS. 4, 5 and 15. If the level should rise, controller 169 acts to open throttle valve 21 and thereby remove oil at a faster rate, lowering the oil to the desired level 163; conversely, if the oil should fall below level 163, action of controller 169 will restrict throttle valve 21, and the oil level will rise. Maintenance of the oil precisely at level 163 has the desirable effect of stabilizing the oil levels in other parts of the system under rotor 175.

Each sector 1 to 8 is hydraulically connected to every other sector through a gap 246 between the bottom of skirt 138 and the top of shutter 189 at base level 161, as illustrated in FIG. 5. Oil flows beneath the skirts of sectors 1 to 8 at relatively low velocity, approximately equalizing pressures in sectors at that low level. For the purpose of the following analysis, it is permissible to assume that the error is negligible if the small velocity heads which this flow of oil at base level 161 reproduces are disregarded. The analysis relates to static equilibrium of connected columns of oil. Thus an approximate balance can be presumed to exist where the sum of static head plus the pressure of vapor on the surface of any oil column, equals the sum of vapor pressure and static head of every other column with which it is connected at level 161.

We choose to use the unit "torr" to designate all pressures. One torr is the pressure necessary to support a column of mercury one millimeter high at 0° C, when mercury has a density of 13.6. For a column of cocoanut oil of density 0.864 at 100° C to exert a pressure of one torr, the column must be higher, in proportion to the ratio of densities of mercury and cocoanut oil. Such an oil column must have this height: $13.6/0.864 = 15.7$ millimeters.

We assume the use of cocoanut oil in the following examples although other edible oils and fats of negligible vapor pressure, may equally well be used.

The above reasoning can be applied to specific examples that predict column heights in sectors with an accuracy sufficient for practical purposes. The numerical values here calculated are cited by way of example and illustration of principle and are not intended to limit our invention. For these principles apply to other instances where the numerical values may be quite different. The float controller 169 fixes the height of the oil column between rotor 175 and case 41 at level 163. A certain vapor pressure of water vapor exists at level 163 by virtue of the connecting port 155 FIG. 14 which equilibrates the vapor pressure inside of case 41 with the vapor pressure Stage III of the vacuum system. It is desired to calculate the heights to which each column of oil will rise inside of each of sectors 1 to 8, in order to set the design positions of screens 106 and 213, and to establish the minimum length of skirts 151. Referring to curves 23 and 24 of FIG. 3, it is known that the maximum vapor head pressure will exist at station $a$, and this pressure will not exceed 100 torr. Therefore the oil column between rotor 175 and case 41 must exert a pressure of at least 100 torr at level 161. Since the vapor pressure on liquid level 163 is known to be that of Stage III, which is approximately 3 torr, and the density of mercury is 15.7 times the density of cocoanut oil, therefore in order for the column of cocoanut oil to exert a pressure 100 torr at base 161, the column must have a height X equal to $15.7 \times (100-3) = 1523$ millimeters, or 60 inches. X is therefore the minimum length of skirt 138, which must extend at least from level 161 to level 163. The distance 1523 millimeters is also the maximum distance oil will rise up a sector at station $h$, when the pressure in the vapor head is 3 torr. Skirt 138 should have an additional height = VS to extend above level 163 and permit the existence of a vapor head space VS above the maximum position that oil can rise in any of the sectors. According to curve 24, the minimum pressure for a sector in Stage II is 18 torr; therefore oil will rise a height of 15.7 × (100-18)=Y = 1287 millimeters. Also, the minimum pressure noted on Curve 24 for a sector in Stage I is 68 torr; therefore oil will rise to a height of 15.7 × (100-68) = 502 millimeters inside that sector, = Z. Oil levels inside the sectors are clearly self regulating, their height being automatically adjusted according to the vapor pressure in vapor head 162 of each individual sector. It follows that screen 106 should exceed 1523 millimeters above level 161. A vapor head space VS of 100 to 200 millimeters between screen 106 and the rotor top 201, gives room for spray nozzle 105, and space in which rising vapor and oil can separate. Similarly a space of about 200 to 300 millimeters provided between screens 106 and 213, when screen 213 is in the horizontal position, gives room for containing the floating charge during the last stages of dehydration. Such fixation of the position of particles is desirable at this time, when the evolution of water vapor only weakly maintains the distention of the pores; for without such restraint, some particles could be carried to lower oil levels by convection currents, and their pores would collapse under the higher hydraulic pressure existing at levels near the bottom of skirt 138.

Movements of parts of the apparatus such as the rotor 175, and the opening and closing of valves in cyclic relationship are accomplished by operation of a hydraulic sequencer 237 in connection with linear hydraulic motors 10a to 20a that move vital parts in timed sequence.

With reference to FIG. 5, a suitable sequencer is depicted symbolically, and fragmentary sectional views are given in FIGS. 6 and 7. Rotary valves 10b–10c to 20b–20c respectively, are driven on a common shaft 238 by motor 239. Motor 239 is supplied from power source 240, which is regulated by a speed governor 241. A reservoir 242 for hydraulic fluid is provided. Pump 243 moves fluid from reservoir 242 under pressure into pipeline 244 which connects with a central port 245 inside shaft 238. The fluid is portioned out of rotary valve 237 in timed relationship, entering the various conduits 10b to 20b to operate motors 10a to 20a respectively, in a timely manner accomplishing the cyclic operations of the dehydrator. Exhaust fluid passes from the motors through conduits 10c to 20c respectively.

With reference to Table 1 and FIG. 5, the action is traced through a complete cycle, lasting 48 minutes. In FIG. 5, we show sector 5 standing over Station a. This station receives the mixture of wet food particles and heated oil at a measured rate through pump 101. Dehydration commences immediately when the particles enter station a, for the oil with which the particles are mixed in hopper 55, is at a temperature sufficient to cause rapid vaporization of moisture from the particles under the vacuum

TABLE 1

Conditions in Sector 5 upon its departure from designated Sector Station, when processing fresh fruit slices, initially 1.6 mm thick, and containing 80% initial moisture.

| Vacuum stage | I | | | II | | III | | |
|---|---|---|---|---|---|---|---|---|
| Sector Station | a | b | c | d | e | f | g | h |
| Departure time, minutes | 6 | 12 | 18 | 24 | 30 | 36 | 42 | 48 |
| Moisture content of slices, % | 75.5 | 67.2 | 35.5 | 16.7 | 9.1 | 7.0 | 4.3 | 2.0 |
| Vapor evolved, kg. | 18 | 38 | 69 | 76 | 78 | 78.5 | 79.1 | 79.6 |
| Vapor-head pressure over station, torr | 87 | 81 | 68 | 18 | 9 | 6 | 4 | 3 |
| Oil temperature, °C | 57 | 57 | 63 | 66 | 78 | 94 | 95 | 30 |
| Buoyancy of fruit slices in oil | 0.9 | 1.01 | 1.02 | 1.03 | 1.06 | 1.1 | 1.2 | * |
| Oil level, in Sector 1, centimeters below zero level | 137 | 127 | 107 | 28.4 | 14.1 | 9.45 | 6.3 | * |

*Contents are now in exit chamber 22.

conditions of station a, but is of insufficiently high temperature to cause vaporization of moisture under the atmospheric pressure of hopper 55. Six minutes later, rotor 175 is shifted 45°.

After 12 minutes, sequencer 237 initiates another counter-clockwise 45° rotation of rotor 175, and so it goes for a full revolution, in which the charge in Sector 5 is carried through all the stations, and has endured all the conditions of the process cycle of Table 1 and curve 24. The liquid level rises as the pressure falls with movement of the charge from station to station. Also the temperature of hot oil in the chamber rises from accumulation of hot oil from spray 105. Spray 105 may be equipped with a thermostatic flow regulating valve that is sensitive to temperature conditions in chamber 162. Such a valve is illustrated in FIG. 15 where thermal regulator 288 is set by movement of adjusting lever 248 against cams 249 which are attached to the inside wall of case 41.

It is shown on curves 23 and 24 that oil temperature should rise at a predetermined rate, as the sectors advance from Station a to Station h. Cams 249a, 249b, . . . 249h, are placed in wall 41 in a manner to move regulating valve 250 to admit the flow of fluid through nozzle 105 which will maintain the oil temperature in every sector at the temperature which is required by curve 24 to be registered for each particular sector station. Owing to absorption of heat by evaporation of moisture from the particles, the oil in every station will tend to cool. Its correct temperature is maintained by flow of hot oil from nozzle 105. A more rapid flow of fluid through nozzle 105 will increase the oil temperature in any sector 162 at a rapid rate; and a lesser flow will allow the temperature to rise at a slower rate. These optimum temperature conditions for each sector station are set by positioning the cam 249. An external cam positioner knob 251 for each station facilitates temperature adjustment.

The function of tab 197 is to cover and uncover exit chamber 22 according to phase requirements. Trap 22 is hermetically sealed at the top by inflated O-ring 15, and at the bottom by closed door 124. O-ring 15 makes sealing contact with tab 197 when tab 197 is in the closed, or clockwise position. Trap 22 permits exit of finished food particles from station $h$, without altering the sub-atmospheric pressure in any vacuum station. This operation takes place in the following steps: first, tab 197 is placed in the closed position, then O-ring 15 is inflated, then air is removed, or trap 22 is filled with cold oil. Then shutter 189 is rotated counter-clockwise 45° to remove tab 197 from the opening. Then hot oil may be pumped out of the sector standing over trap 22, and screen 213 may be lowered to discharge the dehydrated contents into trap 22. Then tab 197 is moved back to cover and seal trap 22. Now rotor 175 may be moved to bring a new dehydrated charge over trap 22 in station $h$. The centrifuge is rotated, deoiling the charge on the centrifuge. Then valve 14 is opened admitting normal atmospheric air to trap 22, and the centrifuge is then stopped and door 124 is opened to discharge the contents. If the contents stick on the centrifuge, they may be released by swinging door 124 up with a bang to dislodge the stuck particles. Before normal atmospheric air is admitted, the cold oil is completely drained away from trap 22.

FIGS. 9 to 12 depict the above-described operation taking place with a swinging door 18 in place of tab 197 to seal trap 22.

Steps of operation of trap 22 are now described in connection with FIGS. 9–12. In FIG. 9, sector 4 is represented arrived over station $h$ with a load of nearly dehydrated, floating particles. Another load of dehydrated particles is on centrifuge bowl 146 in the stage of being cooled and de-oiled. Valve 10 is open to permit water vapor to be absorbed from the vapor face of sector 4 into Stage III vacuum system at about 3 torr. All the sectors are hydraulically in static communication at level 161, and the liquid heat transfer medium rises to the high level X in sectors 2, 3, and 4, which stand over stations $f$, $g$, and $h$, respectively and are in communication with Stage III, but the liquid rises only to level Z in sectors 4, 6, and 7, which stand over stations $a$, $b$, and $c$, and are in communication with Stage I, which maintains a pressure of about 50–100 torr in the latter sectors. With completion of the centrifuge cycle, all oil has been pumped out of trap 22 through screen 17 and drain pivot 145, air is admitted to trap 22, and door 124 is opened, to discharge the contents of dehydrated, de-oiled food particles as in FIG. 10. Meanwhile, inflation of O-ring 15 has sealed off sector 4, permitting hot oil to be pumped out of that sector. After trap 22 has been emptied, door 124 is closed as in FIG. 11, and air is exhausted from the interior; then upper door 18 may be opened, discharging contents of sector 4 into trap 22 for de-oiling in the centrifuge. Then door 18 is closed, and rotor 175 moves one step counter clockwise, shifting sector 4 into Stage I at station $a$. In order to move the rotor 175, seal ring 15 must be momentarily deflated, as in FIG. 12. Mixed oil and water vapor will surge into empty sector 4 at this moment. In order to avoid entry of higher pressure water vapor from Stage I into low pressure Stage III, valve 10 is closed during the moment of shift of sector 4 from station $h$ to station $a$ position. When the 45° counter-clockwise movement of rotor 175 is complete, sector 3 stands over station $h$, and a new cycle commences.

Table 1 illustrates an example of automatic control of the process that has just been described, and is carried out with aid of the rotary controller 237 of FIGS. 5, 6, and 7. In Table 1, a process cycle lasting for 48 minutes is assumed. This will accomplish the process of curve 24, FIG. 3, where fruit slices 1.6 mm are puffed and dehydrated. A longer dehydrating time is required for thicker slices; for example, at least 120 minutes are required to dehydrate slices of fruit that are 5 to 7 mm thick, according to curve 23.

Table 2 gives the timed sequence of operations at station $h$, the exit station in which the slices are reduced to about 2% moisture, are cooled and centrifugally de-oiled, and are then automatically discharged from the centrifuge.

Table 3 gives the schedule of action for automatic control of the apparatus when using shutter 189 and tab 197 to control delivery of contents of station $h$ into trap 22.

TABLE 2

| Timetable of actions at station h and in trap 22 | | | | | | | | |
|---|---|---|---|---|---|---|---|---|
| Initiating time, minutes: seconds | | 42:00 | 42:05 | 45:00 | 45:10 | 46:00 | 47:00 | 47:30 | 48:00 |
| Top screen | 18 | shut | shut | shut | shut | shut | open | shut | shut |
| Top screen drain valve | 20 | shut | shut | shut | shut | open | open | shut | shut |
| Bottom screen | 17 | shut | shut | shut | open | shut | shut | shut | shut |
| Bottom screen drain valve | 19 | open | open | open | shut | shut | open | open | open |
| Vapor head ring seal | 15 | swell | swell | swell | swell | swell | swell | contract | swell |
| Centrifuge motor | 16 | spin | spin | off | stop | stop | stop | start | spin |
| Equalizer valve | 12 | open | shut | shut | shut | shut | open | open | open |
| Cold oil spray valve | 13 | open | shut | shut | shut | open | open | open | open |
| Trap vent valve | 14 | shut | shut | open | open | open | shut | shut | shut |
| Vapor head assembly accuator | 11 | stop | stop | stop | stop | stop | stop | move close | stop |
| Vacuum valve | 10 | open | open | open | open | open | open | close | open |
| Oil level, in station h, | | | | | | | | | |

TABLE 2-continued

Timetable of actions at station h and in trap 22

| Initiating time, minutes: seconds | 42:00 | 42:05 | 45:00 | 45:10 | 46:00 | 47:00 | 47:30 | 48:00 |
|---|---|---|---|---|---|---|---|---|
| centimeters below zero level | 6.3 | 6.0 | 5.5 | 5.5 | 4.7 | 130 | empty | 6.3 |
| Actions in centrifuge trap 22 | centrifugal deoiling | centrifugal deoiling | centrifuge decelerating | trap emptying | filling with oil | cold oil displaces air | hot fruit enters | fruit cools |
| Temperature °C in trap 22 | 38 | 35 | 35 | 35 | 30 | 30 | 40 | 39 |

Table 3

Timetable of actions when using shutter 189

| Initiating time, minutes: seconds | Movement of rotor 175 | Position of shutter 189 | Action above shutter 189 | Action beneath shutter 189 |
|---|---|---|---|---|
| 42:00 | Standing in half step position shown by dotted lines in FIG. 26. | In left stop position. Tab 197 covers trap 22. | Oil level in station e' stabilized at position −x'. Oil level in stations f' and g' set at −x". | Door 17 is closed. Cool oil fills trap 22. Air is displaced out vent nozzle 117. O-ring 15 is deflated. Mixture of wet fruit and oil continuously fed in through pipe 66. Oil withdrawn at pre-set suction pressures through valves 252 and 253. |
| 42:01 | Rotated to whole-step position shown by solid lines, FIG. 26. | | | |
| 42:02 | | Moved to right stop. Tab 197 uncovers trap 22. (dotted lines) | | |
| 42:03 | | | Inflate O-ring 15. Station h and trap 22 are now in communication. Hot oil level falls below shutter 189 at station h. Hot oil removed through reverse flow out nozzle 117. | |
| 42:08 | | | Cold oil spray from nozzle 105-h cools puffed fruit on screen 213-h, and is removed through nozzle 117. | |
| 42:50 | Lower screen 213-h in sector over station h. | | Cooled, puffed fruit falls through shutter opening into cool oil in trap 22. | |
| 42:59 | | Moved to left stop. | | Puffed fruit floats on cool oil in trap 22, beneath tab 197. |
| 43:00 | Rotated to half step position shown by dotted lines in FIG. 26. | Tab 197 covers trap 22. | Dehydration continues with oil level of station e' lowered to −x' position and level of oil in stations f' and g' lowered to −x" position. | O-ring 15 is inflated, sealing tab 197 in left stop position, and isolating trap 22. Oil is pumped out of trap 22. Puffed fruit in trap 22 is cooled by cool oil from spray 117. Sprayer 117 is shut. Centrifuge is spun. |
| 47:00 | | | | Centrifuge stopped. Air admitted through nozzle 117. Screen door 17 opened. Centrifuge emptied. |
| 48:00 | Start new cycle. | | | |

DETAILED DESCRIPTION OF THE PROCESS

Table 4 lists a convenient notation for the various thermodynamic and other quantitative relationships required, and this system of notation is used in the present specification. Curve 25 shows that the most rapid rate of evaporation occurs in Station $a$, and evaporation rate falls off, allowing pressure in the vapor head also to fall closer to the pressure $P'b$ which exists in the suction of condensor 58. Pressures in the various vapor heads will necessarily be higher than pressures $P'b$, $P''b$ and $P'''ob$ existing at the suction inlets of the primary vacuum generators, condensor 58, and steam evactors 75 and 76 respectively. The higher the rate of flow of vapor through the various conduits and valves, the higher is the pressure drop. Thus, with $P'b = 48$ torr, the vapor head pressure in the sector at Station $a$ may initially be 90 torr, the pressure drop of $90-48 = 42$ torr being attributable to the high rate of vapor flow. As dehydration progresses, vapor flow rates decrease and pressure drop due to fluid friction in the valves and conduits also declines, and Station $c$ may have a vapor head pressure of 68 torr while discharging its vapor into the same condensor 58 in which the suction pressure $P'b$ remains steady at 48 torr.

The flesh of fruit undergoing dehydration is soft, when hot; the case-hardened skin of macro-pores is also soft, and distention or puffing is similar to inflation of a rubber balloon, subject to collapse should outside pressure exceed inside pressure. Therefore it is important that there always be a positive generation of vapor pressure within the macropores of the particles in order to keep the particles inflated and floating on oil. But as evaporation continues from station to station, the sugars and other solutes within the fruit particles concentrate, and the pressure potential of water vapor declines. Hence it is necessary to both increase the temperature of the liquid heat transfer medium and decrease the vapor head pressure in order to keep the particles in an active state of water vapor evolution and to maintain pressure to distend the macropores and hence to maintain buoyancy.

Should these favorable conditions fail, the particles will suffer collapse of the macropores and loss of buoyancy. Loss of buoyancy will allow the particles to sink to lower oil levels where hydrostatic pressure may be greater than water vapor pressure of the fruit, and dehydration will therefore ease. We rely upon correct engineering design of the condensor, the evactors and the various conduits, including the sizing of ports of valve 42, well known to those skilled in the art, to provide conditions that will maintain pressure schedules substantially as in the curves of FIG. 3. Our invention resides not in these features of engineering, but in the discovery, not obvious, that the combination of soundly engineered components in the manner specified herein, will produce the novel results defined in the claims appended hereto.

DETAILED DESCRIPTION OF THE PROCESS

We have described the preferred apparatus, in connection with FIG. 2, which will utilize solar energy or other sources of heat for dehydration of persistently non-floating food particles. These particles rest on a surface in a sector subject to vacuum and the movement of liquid heat transfer medium over them until they are dehydrated to the desired moisture content, then they are discharged. Other important fruits and vegetables, such as sliced apple, pineapple, banana, onion, whole grapes, and fresh-picked green peas, and others, will float in vegetable oil after dehydration has produced a case-hardened skin, and macro-pores have formed. This is a desired condition, for flotation gives a means of support without packing the particles together, and enables the manufacture of fruit chips from very thin slices, resulting in a product of unusual delicacy.

Figure 1:
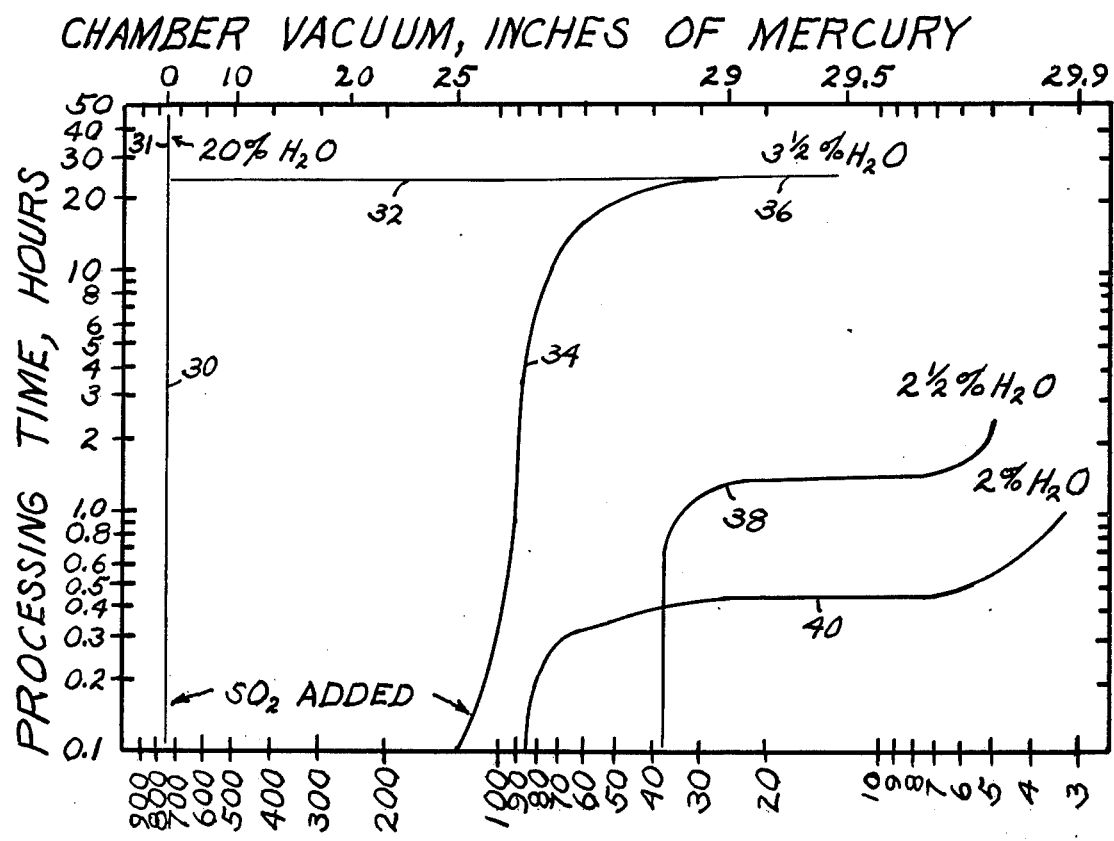
FIG. 1 is a graph containing curves that compare the conditions of pressure and the duration of exposure to heat used in the prior art, with pressures and duration of the present invention.

Referring now in particular to FIG. 1, there is illustrated in curve 40 a preferred processing condition for manufacturing puffed fruit chips from particle slices of about 1.6 millimeters in thickness. We are able to process such thin slices because of the unique method of suspension of the particles in a liquid heat transfer medium through free convective flotation. The speed-up in processing time through thin-slicing is apparent by comparison of curve 40 with curves 38 and 36, where in the prior art, thick slices of a rigidity to withstand abuse in the processor were dehydrated. This abuse came about mainly when the finished fruit had to be removed from processor surfaces such as screens to which the particles had stuck, and also the particles stuck to each other and to tray supporting surfaces and were often broken when removed. Even though they started with large thin wet slices, earlier processors could not produce a thin large diameter chip with consumer appeal for its tender brittle texture, as can be produced with the present invention. A processor, for example continually agitates his slices in a batch process that produces curled-up and abraded products; and delicate slices stuck to screens of Webb's original processor, U.S. Pat. No. 2,473,184.

The preferred method of support of thin, fragile slices by flotation, makes possible the elimination of confining means above and below the processing zone, during the initial drying period. Thus at stations $a$, $b$ and $c$, only vertical walls 138 guide the floating particles through the processing zones. Screens 106 and 213, though present, are not pressing on the particles, and the particles do not stick to these screens. In later stages, when screen 213 is moved up, the particles are so dry that they do not stick to this screen. Screen 106 is always up above the particles, out of contact with them, and so the particles cannot stick to it.

Attention is focussed on a particular portion, which may weigh 10 kg, and comprises the charge in a single sector or chamber 71 of the apparatus of FIG. 15. This charge is one of the succession of charges that move progressively from the inlet station $a$ to the discharge station $b$. The conditions of oil temperature and vapor head pressure are made to comply with the conditions set forth in FIG. 3 at each station. The wet fruit slices enter station $a$ at approximately 80% moisture content, are contacted with heat transfer medium at about 50° C at a pressure of about 80 torr. As the charge is moved through the series of stations, the temperature rises, and the vapor head pressure falls, until at the end station, the temperature is about 99° C and the vapor head pressure is about 3 torr, and as result of this treatment, the particles are puffed and dehydrated to about 2% moisture content. Then the particles are cooled with cool oil, they are centrifugally de-oiled, and restored to normal atmospheric pressure.

All the curves in the graphs of FIG. 3 are drawn against the abscissa, Vapor Head Pressure, expressed in torr. The ordinate of curves 23 and 24 is process time, or Duration of Evaporation, expressed in minutes.

Curve 23 illustrates the drying rate, or length of time required at each of the three vacuum stages, and notations also indicate the temperature of the oil at each of the processing stations, when a fruit slice of about six to eight millimeters thickness was dehydrated from the fresh condition of about 80% moisture content to the crisp, puffed condition of about 2% moisture content. It is to be noted that approximately two hours of drying time are required for this thickness of fruit slice.

Curve 24 illustrates the time, temperature and pressure conditions that were utilized to make thin fruit chips from slices 1.6 millimeters thick, of the same fruit as was used in curve 23. Again, the initial moisture content was about 80%, and the final moisture content was about 2%, and a crisp delicate chip was produced. A noteworthy increase in drying rate was obtained that reduced drying time from 2 hours required for the thick slices of curve 23 to less than 1 hour for the thin slices of curve 24.

Curves 25 and 26 represent the weight of water vapor evolved, and the percent moisture content of the fruit slices, respectively, during the course of passage of the fruit slices of curve 24, when 10 kg of fresh slices were processed. Reading the progress of the process from the right-hand side of curve 25 to the left-hand side, it will be seen that the major portion, or about 6.8 kg of the moisture which was to be evaporated from these thin slices, came out of the fruit under vapor head pressure conditions of 90, 82, and 68 torr, and at oil temperatures of 57° C, 63° C, and 66° C, in stations $a$, $b$, and $c$, respectively, of the processor. The 6.8 kg of water vapor passed through valve 42 into evactor Stage I which is maintained at a substantially lower pressure than the pressure in the vapor heads. When the sector charge passed through station $d$, a minor portion, or about 0.8 kg of vapor was discharged into the vapor head of station $d$. Station $d$ discharged the 0.8 kg of vapor through valve 42 into evactor Stage II where the pressure was reduced by evactor 75 from the initial vapor head pressure of 68 torr to the final vapor head pressure for station $d$ of about 18 torr. When the sector charges passed in succession through stations $e$, $f$, and $g$, the remainder of the moisture which was to be evaporated, or about 0.3 kg discharged into Stage III at a final vapor head pressure for station $g$ of about 4 torr.

Curve 23 shows that in the dehydration of apple slices of about 6–8 mm thickness, the duration of evaporation is stretched out, and comparatively more water vapor comes off at the lower absolute pressures. For that reason Stage II was lengthened when these thicker slices were processed, to include stations $c$ and $d$. Out of the total of 7.9 kg of vaporizable moisture, 6.1 kg was evaporated in Stage I and the vapor head pressure in station $c'$ was about 76 torr; 1.4 kg of moisture were evaporated into Stage II and the vapor head pressure of the last station of the group, station $d'$ was 11 torr.

Approximately 0.4 kg of moisture were vaporized at a pressure in the vapor heads of Stage III of approximately 4 torr.

The vapor head pressures are always higher than the respective pressures at the inlets to the steam ejectors 75 and 76 and the inlet to condensor 58. This gives a pressure head to drive vapors from the vapor heads through the resistances of valve 42 and the piping leading to the respective ejectors and the condensor.

During dehydration hot oil is sprayed on the floating particles from nozzles 105, shown in FIGS. 4 and 15, to maintain the temperature of the liquid heat transfer medium in the particular stations at the temperature levels noted above. In general, a flow of liquid heat transfer medium proceeds from the warmer zones at the top regions of the chambers 71, downward in the direction of the oil outlet screen 136; that is, the liquid heat transfer medium flows generally counter currently to the direction of progress of the food particles through the various sectors of the apparatus.

FIG. 5 illustrates the carrying out of the process of the present invention wherein the particles become puffed in the vacuum conditions of Stage I, and are carried thenceforth in the floating condition through subsequent stages. Except for this one feature of floating, and the modifications necessary to accomodate floating particles, all features of vacuum application, heat transfer by a liquid heat medium, automatic control and advancement of stations, and the like, apply also to the cases where non-floating particles are processed, as in the apparatus of FIG. 2.

Referring to FIG. 5, a development of a rotary device is seen, embracing the concept of processing particles floating in the oil. Movement of the chambers is from left to right; and the movement is stepwise; wherein actuator 135 quickly moves the assembly of chambers one timed step at a time, and between movements, there is a pause, which may last several minutes, and during the pause, the particles and the oil are reacting to produce dehydration at a phase of the process that is peculiar to the conditions of temperature and pressure in the particular station that each of the chambers has stopped at.

The delivery of food particles into the apparatus is from atmospheric pressure of about 760 torr on the surface of mixer 55, FIG. 4 to the region of about 90 torr in the bottom of the oil layer of Stage I. The motor speed should be governed to operate more or less at pre-determined constant speed to ensure the correct rate of delivery of fruit particles and oil into the processor, and thus to load the processor to work at its optimum rate. The mixture of particles enters the processor through pipe 66 into the bottom of one of the initial stations of the process: for apple chips, station $a$ would receive the initial loading. Evaporation of moisture from the surfaces of the particles quickly case-hardens the surfaces, then macro-pores form inside the particles that swell and provide buoyancy of the particles in the oil. For particles that are slow to float, but which will float in oil after more or less protracted dehydration and puffing in the vacuum of Stage I, it is desirable to enter the feed at station $c$. There the particles may be subjected to the flow of heated oil moving from pipe 66 toward oil outlet screen 136, as shown in FIGS. 5 and 17, and be carried slowly by the oil movement toward station $a$. At station $a$, such particles puff and begin to have a specific gravity less than that of the oil, and float close to the surface. The particles float into one of the chambers 71 and are thenceforth carried through the successive stations to the exit point.

The particles are constantly giving off bubbles of water vapor that agitate the oil, and therefore the particles at first move about more or less at random both at the surface and beneath the surface of the oil. Upon further dehydration, the particles become totally buoyant and they float up to the surface of the oil, to be captured on the oil surface inside a chamber 71 by two adjacent walls 138—138 of the rotor, and when they have given up most of their biological water, they are carried out of Stage I into station $d$, where the vacuum is generated by Stage II vacuum system. Then the particles are moved through stations $e$, $f$, $g$, and into the exit station $h$ where the vacuum is generated by Stage III vacuum system.

Oil levels in the various chambers 71 depend upon the pressure at the surface of the oil layer in the chamber 71 which we name the vapor head pressure. This follows because all chambers are open at the bottom at level 161, where the hydrostatic pressure is equal all around the processor, at that level, and the surface of the oil in each chamber is exposed to the pressure of water vapor that is passing upward through the oil into the vapor head and then into valve 42 and the vacuum stage with which valve 42, at the moment, connects the chamber. The region under dome 94 (see FIG. 4) is exposed to the full vacuum of Stage III, or about 3–4 torr. There is a space allowed between the outside of the rotor 151 and the inside of dome 94. A liquid level 163 is established in this space at the height which generates hydrostatic pressure to equal the pressure at level 161.

Referring now, to FIG. 25, there are seen curves that define optimum conditions of pressure and temperature for carrying out our process, where vapor head pressure in torr is plotted on a logarithmic scale as the abscissa, and temperature is plotted on a linear scale as the ordinate. The ice-liquid-vapor curve for water is plotted for convenience of reference, curve 164. Curve 165 shows the lower part of the range of temperature of the liquid heat transfer medium, and the vapor head pressure at which a fresh fruit particle such as an apple slice containing about 80% moisture will begin to give off water vapor at a rapid enough rate for case-hardening and puffing. Curve 166 shows the upper boundary of the same range of temperatures and pressures. Regions A, C, F above curve 165 show the optimum range of practical conditions of vapor head pressure and liquid heat transfer medium temperature, for rapid puffing, flotation and evaporation of the major part of the water of the particle. The ranges of pressures and temperatures of Stage I is shown to be from about 7 torr to 55 torr and from about 30° C to 70° C in Stage 1, about 6 to 9 torr and about 42° C to 90° in Stage II; and a pressure of about 1 to 9 torr in Stage III.

The major portion of the biological water of the fruit particle will evaporate and will pass into the condensor of Stage I under the heat and pressure conditions of regions A, C, and F.

Curve 166 indicates approximately the minimum temperature of the liquid heat transfer medium, and regions B, D, and G show the approximate range of vapor head pressures and liquid heat transfer medium temperatures within which efficient conditions are found for Stage II of the dehydration process. It is to be noted that region B includes vapor head pressures ranging from about 12 torr to less than 3 torr, and a temperature range of about 30° to 100° C. On the other hand, regions D, and G, are more limited and are bounded on the high-temperature limit by curve 167. Regions E, H, above curve 167 represent the range in which Stage III is absorbing the water vapor at the lowest absolute pressure of the process, which may be 3 torr, or lower pressure.

Examples of the Use of Ambient Heat Resources

Quantitative relationships are derived from the operation of the process of the present invention, which are best defined by the notation of Table 4. These quantities are given numerical values, or they can be derived for any desired application, by reference to the examples of Tables 5, 6 and 7.

The practical application of our invention is illustrated in the examples, where Table 5 shows experience in the preparation room where peels and cores and stems are removed from the raw material, and the materials are sliced when necessary before being sent to the dehydrator. Slices of any desired thickness can be dehydrated. Curve 23 shows one example of apple slices about 10 mm thick, which required approximately 2 hours in the dehydrator. Curve 24 shows the drying rate for slices of the same fruit, cut about 2 mm thick, and which dehydrated to 2% moisture content in less than one hour. The thicker slice absorbs less vegetable oil, and is superior for cooking, for example pie making; whereas the thinner slices, are crisp dainty confections eaten raw. Table 6 shows the characteristics of these and other products manufactured by our invention.

Table 7 shows the thermal schedule for the manufacture of several products, in which heat sources other than burning fuel are used.

Our invention is particularly useful in dehydration when low temperature heat sources are available, in conjunction with a low temperature heat sink, for example by-product steam in an area where winter temperatures prevail to cool the cooling water. The advantages of manufacturing apple chips under these conditions are tabulated in Examples 1 and 1' of Table 7. Example 3 shows the application of solar energy to manufacture pineapple chips in a tropical location, for example Hawaii; and Example 10 demonstrates the advantages of using low pressure steam that is available where onions and seedless grapes grow in California.

TABLE 4

Notation for ejector-condensor vacuum system, FIG. 4

Stage I, motivated by condensor 59

| | |
|---|---|
| $W'a$ | Weight of cooling water, kg/hr |
| $P'a$ | Pressure at top of condensor, torr |
| $T'a$ | Temperature of cooling water, °C |
| $W'b$ | Weight of suction vapor, kg/hr. $W'b = W'ob + W''c$ |
| $P'b$ | Pressure of suction vapor, torr |
| $T'b$ | Temperature of suction vapor, °C |
| $W'ob$ | Weight of vapor discharged from Stage I, kg/hr |
| $P'ob$ | Pressure of vapor discharged from Stage I, torr |
| $T'ob$ | Temperature of vapor discharged from Stage I, °C |
| $W'c$ | Weight of water discharged from condensor 59, kg/hr |
| $T'c$ | Temperature of water discharged from condensor 59, °C |
| $P'c$ | Pressure of water discharged from condensor 59, torr |

Stage II, motivated by steam-ejector 75

| | |
|---|---|
| $W''a$ | Weight of motive steam, kg/hr |
| $P''a$ | Pressure of motive steam, torr |
| $T''a$ | Temperature of motive steam, °C |
| $W''b$ | Weight of suction vapor, kg/hr. $W''b = W''ob + W'''c$ |
| $P''b$ | Pressure of suction vapor, torr |
| $T''b$ | Temperature of suction vapor, °C |
| $W''ob$ | Weight of vapor discharged from Stage II, kg/hr |
| $P''ob$ | Pressure of vapor discharged from Stage II, torr |
| $T''ob$ | Temperature of vapor discharged from Stage II, °C |
| $W''c$ | Weight of vapor discharged from ejector 75, kg/hr |
| $P''c$ | Pressure of vapor discharged from ejector 75, torr |

Stage III, motivated by steam ejector 76

| | |
|---|---|
| $W'''a$ | Weight of motive steam, kg/hr |
| $P'''a$ | Pressure of motive steam, torr |
| $T'''a$ | Temperature of motive steam, °C |
| $W'''ob$ | Weight of vapor from Stage III, kg/hr |
| $P'''ob$ | Pressure of vapor from Stage III, torr |
| $T'''ob$ | Temperature of vapor from Stage III, °C |
| $W'''c$ | Weight of vapor discharged from ejector 76, kg/hr |
| $P'''c$ | Pressure of vapor discharged from ejector 76, torr |

Notation for liquid heat transfer medium

| | |
|---|---|
| $W'$ | Weight of oil entering Stage I, kg/hr |
| $T'$ | Temperature of oil entering Stage I, °C |
| $W''$ | Weight of oil entering Stage II, kg/hr |
| $T''$ | Temperature of oil entering Stage II, °C |
| $W'''$ | Weight of oil entering Stage III, kg/hr |
| $T'''$ | Temperature of oil entering Stage III, °C |
| $W*$ | Weight of oil leaving dehydrator, kg/hr |
| $T*$ | Temperature of oil leaving dehydrator, °C |

Economical condensation of water vapor that arises in dehydration by the present invention, may be accomplished by any of several means that are well known to the art. The following system is preferred. Referring again to FIG. 4, a three stage vacuum system is shown, that is suitable for use in connection with dehydrator 94. Stage I may be a barometric contact condensor with barometric leg 157. The condensor may be supplied with cold water from water cooler 74, injected into condensor 58 by pump 86. A primary vacuum pump 110 may be used to create initial vacuum in the system, and to remove any air not removed by condensor 58. Water vapor from Stage I of processor 94 and from jet 75 are condensed by condensor 58. Stage II may be motivated by a steam ejector 75 with suction line 122 and steam supply line 90 from a low-pressure boiler 88 which is heated by burner 102 and is supplied with water by pump 92 from reservoir 229. Boiler 88 may simply be a hot water accumulator for conserving heat from an available source such as a solar heater, a geo-thermal, or a by-product heat source. Stage II discharges the compressed water vapor that flows out from conduits 122 and 112 into conduit 121, and then into the suction inlet of condensor 58. Stage III may be motivated by a steam ejector, such as 76 which also acquires steam from boiler 88.

It is possible for one versed in the art, to design the area of the steam nozzle $A_t$, and the area of the throat $A_2$ of ejectors 75 and 76 in such a way that very low pressure steam will operate the ejectors efficiently. For example, when the water passing through condensor 58 is at 26° C or lower temperature, the condensor will absorb water vapor at 48 torr. If the ratio of the throat to the nozzle, $A_2/A_t$ of the steam ejector 75 equals approximately 35, then the ejector will produce a compression ratio $P''c/P''b$ equal to approximately 4.0. Thus the ejector will absorb water vapor at 12 torr from conduit 112, and compress the vapor to a pressure $P''c$ equals 48 torr for injection into the suction of condensor 58. Under these conditions the ratio of suction to motive pressure $P''b/P''a$ equals approximately 0.016, and the required motive pressure $P''a$ is therefore $12/0.016 = 750$ torr. Similarly, steam at an absolute pressure of 750 torr, or even lower pressure, can be used to motivate ejector 76 to operate at a compression ratio $P''c/P''b$ equal to 4, and compress water vapor from conduits 113 and 123 from 3 torr to 12 torr. Thus our invention makes it possible to maintain adequate levels of vacuum with low-pressure motive steam, or high entropy steam from which substantial amounts of power may already have been extracted, for example exhaust steam from a steam turbine.

In some instances it may be unnecessary to use Stage II, and in such case, valve 154 may be opened to by-pass the vapors from conduit 112 directly into conduit 121. Valve 154 would be opened when there is a plentiful source of very cold water for condensor 58; for example, in winter weather in northern latitudes when processing apple slices, cooling tower 74 may deliver water at 10° C or even lower temperature. In freezing weather, with water for condensor 58 at a temperature of 0°–1° C, Stage I will operate at about 5 torr. Then, when dehydrating apple slices, Stage III may be dispensed with, by opening valve 155; and ejector steam consumption would be nill.

Primary heat, for supplying the major proportion of heat for vaporization of moisture from food particles may be used at relatively low temperatures of 40°–50° C. Heated fluid, for example by-product steam, brine from a solar pond or other warm fluid may be passed through coil 222 to heat the water in oil heater 47 to an appropriate range, thereby to heat the oil layer 204 that floats upon the water. Heated oil at 40°–60° C or higher temperature from oil layer 204 is skimmed off of the water in heater 47 and is moved by pump 96 into pipe 97 which conducts the oil to contact food particles in hopper 55. Food particles are carried out of the preparation room at a rate regulated by an automatic weighing machine 230 with conveyor belt 98 that delivers a relatively continuous procession of particles into hopper 55. A relatively stable level of oil is maintained near the top of hopper 55 by action of float 103 which regulates oil inlet valve 198. Fruit and vegetable particles sink in oil at the normal atmospheric pressure which prevails over hopper 55. The contents 100 of hopper 55 comprise a mixture of heated oil and food particles that are carried away by pump 101 and injected into the bottom of station $a$, station $b$, or station $c$ of processor 94, by means of pipe 66. Pump 101 may be regulated also, by float 103, whereby a low level of oil will reduce the speed of motor 104, which drives the pump, and thereby will permit the level to rise to the proper level in hopper 55. Conversely, a high oil level will cause the motor to speed up, and remove oil and food particles to reduce the level.

Oil at higher temperatures in the range 70°–125° C is heated in the central part 231 of oil heater 47. Heat is supplied by solar rays concentrated by mirrors 50–51 to shine on a blackened metal surface 87 that may be the surface of a steam generator. The oil is in direct heat-transfer relationship with steam generator 87. Heated oil at 70°–125° C or higher temperature is extracted from oil heater 231 by operation of pump 93, and this oil is injected in regulated amounts into spray nozzles 105 which spray the oil over screen 106, from the tops of the vapor heads 162. The oil passes through the screens 106 and is distributed as a relatively uniform rain of oil over the food particles that are floating beneath the screen. Oil from sprays 105 that has been cooled by contact with food particles, thereby acquires a higher density than hotter oil, and the cooler oil sinks to the low level 161. The cool oil flows beneath the skirts 151 of chambers 71, and then passes to outlet pipe 108, from which the cool oil is recirculated by pump 107 through oil heater 47. In its passage over food particles the oil has acquired small suspended particles of the food, which settle across interface 202 into the water of heater 47. Water in heater 47 should be kept fresh and clean by continuously discarding a small amount from the bottom of the container and adding an equal amount of clean water at the top level.

The reservoir of hot oil 231 at the center of oil heater 47 is replenished by flow of oil from oil layer 204, to compensate for oil withdrawn through pipe 205.

In FIG. 4 a relatively versatile mode of operation is utilized, that takes into account the variable nature of solar energy input. On clear days, with solar rays 45 at high intensity, steam generator 87 will take an input of water from pump 92 and deliver steam to steam outlet 89, steam lines 87 and 232. Thus, on sunny days, ejectors 75 and 76 may be energized and vacuum of processor 94 maintained by solar energy. Additional steam, generated by solar energy is delivered to oil heater 91. An auxiliary oil tank 126 is provided that contains a stored supply of hot oil which is available to tide over momentary cloudy periods. The oil in tank 126 is purified by centrifugal machine 127, and is brought into use, when needed, by pump 128.

EXAMPLE NO. 1

By-product steam at 120° C was available from the exhaust of a turbine of a near-by steam-electric plant in an apple-growing region. In autumn, before freezing weather, the water available from a water cooler was maintained at 10° C for use in condenser 58. Apple chips of about 2 mm thickness were manufactured according to Example No. 1, Table 5, without using any energy source other than the turbine exhaust steam, which was passed into boiler 88 which acted as an accumulator, and supplied all energy for heating the heat transfer medium which accomplished dehydration, and supplied steam for the steam evactor jet of Stage III. Stage II evactor was not used, as low pressure was achieved in Stage II owing to the low temperature of the water available to cool condenser 58.

EXAMPLE NO. 1'

During midwinter in the same location as Example 1, liquid water from a frozen pond was available at 0° C to cool condenser 58. A satisfactory crisp apple chip product, somewhat browned on the surface, was manufactured without utilizing any steam for evactor jets 75 and 76; the condensing power of condenser 58 was adequate to maintain vacuum for this product.

EXAMPLE NO. 3

In every environment there are ambient temperature differences. Thus the tropical sun provides energy that heats artificial brine ponds to temperatures in excess of 50° C, according to the report of Hudec and Sonnenfeld in Science, Vol. 185, pages 440–442. In the same location, wet-bulb temperature of less than 28° C is simultaneously realized. Thus by reference to curve 165 of FIG. 25, we are able to operate a vacuum in which the major portion of the moisture of fresh fruit slices is evaporated by heat derived from hot brine of such a solar pond, that is passed through heat exchanger 222 of FIG. 4 and heats the water of oil purifier 47, which in turn heats the oil interface 202 and the oil layer 204 to about 66° C. Water vapor arising in Stage I has a pressure of about 40 torr, which is readily condensed in condensor 58 when cooling tower 74 supplies the latter condensor with flowing cool water at a temperature of approximately the prevailing wet bulb temperature of the region, of about 24°–28° C.

EXAMPLE NO. 3

Table 7 illustrates the manufacture of pineapple chips under these conditions. The process is conducted entirely by use of solar energy, even for the generation of steam for Stages II and III when the sun shines on mirrors 50 and 51 to generate steam in minor quantities, as illustrated in Table 7 and FIG. 4.

EXAMPLE NO. 10

Saturated geothermal steam at a temperature of 121° C is available near irrigated desert locations where onions and Thompson Seedless grapes grow. Both of these products can be dehydrated under conditions of Example 10, Table 7, without utilizing an energy source other than steam out of the ground.

We have now shown how we can operate under normal weather conditions of both summer and winter to make efficient use of relatively low temperature heat energy sources for dehydration of foods at a rapid rate, producing attractive puffed fruit and vegetable products. Our heat sources, at temperatures below about 125° C, and even as low as 30° C in some instances, have little or no potential value for the generation of electrical or mechanical power for practical use; but such low temperature heat sources are highly useful in our invention. We absorb this low temperature heat energy into our system and use it efficiently to dehydrate food particles, generating the major portion of water vapor of the particles at a higher sub-atmospheric pressure, and we condense this major portion of water vapor without further compressing it; and we discard the heat units arising from condensation, upon condensing surfaces that are at temperatures of approximately the wet

TABLE 5

Preparation of Wet Commodities in Amounts Sufficient to Produce 100 kilograms of each Vacuum Dried Product

| Example | Commodity | Uncut weight, kg | Trimming loss, kg | Prepared wet comestible, kg | Slice thickness before drying, mm |
|---|---|---|---|---|---|
| No. 1 | Apple | 395 | 99 | 296 | 1.6 |
| No. 2 | Apple | 568 | 142 | 426 | 12.7 |
| No. 3 | Pineapple | 900 | 405 | 495 | 1.6 |
| No. 4 | Pineapple | 991 | 446 | 545 | 5.1 |
| No. 5 | Pineapple | 860 | 387 | 473 | 6×6×23 |
| No. 6 | Grape | 430 | 20 | 410 | whole |
| No. 7 | Banana | 578 | 289 | 289 | 2.8 |
| No. 8 | Blanched carrots | 755 | 189 | 566 | 2.2 |
| No. 9 | Shoestring potatoe | 527 | 105 | 421 | 10×10×110 |
| No. 10 | Onion | 836 | 254 | 582 | 3.2 |
| No. 11 | Green peas | 1580 | 917 | 664 | whole |

TABLE 6

Vacuum Dehydration and Puffing of Prepared Fruits and Vegetables

| Example | Water in wet comestible kg | Evaporation of moisture | | | Analysis of finished product | | | |
|---|---|---|---|---|---|---|---|---|
| | | Stage I, kg | Stage II, kg | Stage III, kg | Oil Content kg | Moisture content, kg | Solids content, kg | Yield of finished product |
| No. 1 | 246 | 211 | 24.8 | 9.3 | 48.8 | 1.03 | 50.2 | 100 kg Apple Chips |
| No. 2 | 354 | 272 | 62.6 | 17.9 | 26.1 | 1.5 | 72.4 | 100 kg Apple Rings |

TABLE 6-continued
Vacuum Dehydration and Puffing of Prepared Fruits and Vegetables

| Example | Water in wet comestible kg | Evaporation of moisture | | | Analysis of finished product | | | Yield of finished product |
|---|---|---|---|---|---|---|---|---|
| | | Stage I, kg | Stage II, kg | Stage III, kg | Oil Content kg | Moisture content, kg | Solids content, kg | |
| No. 3 | 420 | 360 | 37.0 | 21.1 | 24.0 | 1.9 | 74.1 | 100 kg Pineapple Chips |
| No. 4 | 463 | 380 | 58.5 | 23.4 | 16.4 | 1.7 | 81.9 | 100 kg Pineapple Rings |
| No. 5 | 402 | 319 | 60.8 | 20.3 | 27.6 | 1.4 | 71.0 | 100 kg Pineapple Wedges |
| No. 6 | 320 | 242 | 60.5 | 16.1 | 8.0 | 1.8 | 90.2 | 100 kg Puffed Grapes |
| No. 7 | 231 | 198 | 23.2 | 8.7 | 41.0 | 1.2 | 57.8 | 100 kg Banana Chips |
| No. 8 | 490 | 445 | 30.9 | 12.3 | 22.6 | 1.6 | 75.8 | 100 kg Carrot Wafers |
| No. 9 | 328 | 256 | 57.8 | 12.4 | 5.5 | 1.9 | 92.6 | 100 kg Shoestring Potatoe |
| No. 10 | 512 | 439 | 51.7 | 19.4 | 28.7 | 1.4 | 69.9 | 100 kg Onion Rings |
| No. 11 | 570 | 482 | 64.7 | 21.6 | 5.3 | 1.9 | 92.9 | 100 kg Whole Peas |

TABLE 7
Thermal schedule for manufacture of 250 kg of finished product per hour.
Approximate thickness of slices before dehydration, 1.6 mm.

| Example | No. 1' | No. 1 | No. 3 | No. 10 |
|---|---|---|---|---|
| Heat source | By-product steam | By-product steam | Solar-heated water | Geo-thermal steam |
| Product | Apple chips | Apple chips | Pineapple chips | Puffed onion rings |
| $W'a$, kg/hr | 86,500 | 105,200 | 239,000 | 323,000 |
| $P'a$, torr | 6 | 13 | 34 | 42 |
| $T'a$, °C | 0 | 10 | 24.4 | 28 |
| $W'b$, kg/hr | 613 | 760 | 1772 | 2400 |
| $P'b$, torr | 7.6 | 14.7 | 35.4 | 43.4 |
| $T'b$, °C | 67 | 68 | 60 | 69 |
| $W'ob$, kg/hr | 613 | 590 | 900 | 1100 |
| $P'ob$, torr | 7.6 | 14.7 | 35.4 | 43.4 |
| $T'ob$, °C | 67 | 70 | 64 | 79 |
| $W'c$, kg/hr | 87,113 | 105,960 | 240,800 | 325,400 |
| $T'c$, °C | 4.4 | 17.2 | 28.8 | 32.4 |
| $P'c$, torr | 760 | 760 | 760 | 760 |
| $W''a$, kg/hr | | | 645 | 1040 |
| $P''a$, torr | | | 702 | 760 |
| $T''a$, °C | | | 98 | 100 |
| $W''b$, kg/hr | | | 227 | 259 |
| $P''b$, torr | | | 9 | 9 |
| $T''b$, °C | | | 98 | 99 |
| $W''ob$, kg/hr | | | 92.5 | 129 |
| $P''ob$, torr | | | 9 | 9 |
| $T''ob$, °C | | | 72 | 83 |
| $W''c$, kg/hr | | | 872 | 1300 |
| $P''c$, torr | | | 35.4 | 43.5 |
| $W'''a$, kg/hr | | 147 | 89.4 | 81.0 |
| $P'''a$, torr | | 1520 | 92 | 760 |
| $T'''a$, °C | | 120 | 50 | 100 |
| $W'''ob$, kg/hr | | 23.5 | 44.7 | 48.5 |
| $P'''ob$, torr | | 3 | 3 | 3 |
| $T'''ob$, °C | | 95 | 90 | 98 |
| $W'''c$, kg/hr | | 171 | 134 | 130 |
| $P'''c$, torr | | 14.7 | 9 | 9 |
| $W'$, kg/hr | 16,700 | 16,000 | 167,000 | 20,200 |
| $T'$, °C | 115 | 115 | 66 | 100 |
| $W''$, kg/hr | | | 11,400 | 5,700 |
| $T''$, °C | | | 78 | 100 |
| $W'''$, kg/hr | | 922 | 4,500 | 3,310 |
| $T'''$, °C | | 115 | 98 | 100 |
| $T^*$, °C | 57 | 57 | 57 | 57 | bulb temperature of the surrounding environment. The minor portion of the water vapor that must be evaporated to complete the manufacture of a puffed fruit and vegetable product, is evaporated under a lower sub-atmospheric pressure, and is separately collected and condensed after compression. We have shown how the compression of the minor proportion of the water vapor can be accomplished by utilizing heat energy, in the form of steam that is at temperatures well within the range of 125° C and lower temperature. Thus, in thermodynamic terms, we make efficient use of energy sources of high entropy, $S = 1.75$ and higher, where $S$ is the entropy of saturated steam after its energy has been substantially exhausted in a steam engine or other prime-mover such as a steam turbine. Such exhaust, or by-product steam is generally discarded as waste in cooling towers and ponds, that absorb unavailable heat units.

Also, we have shown how energy sources of even lower temperature and higher entropy, such as geothermal steam that issues from the ground at atmospheric pressure, and solar energy from a solar-heated pond at about 60° C can be efficiently used to evaporate the major portion of the water vapor of puffed fruit and vegetable products; and this vapor can be condensed separately in a condensor cooled by ambient weather conditions, while the minor portion of the vapor at the finishing stage of the dehydration process is compressed and condensed.

Furthermore, we have shown a method and apparatus by use of which, the production of friable puffed fruit particles may be automatically manufactured from these high entropy heat sources, requiring the very minimum of labor for monitoring the operation of our machinery.

The term "entropy," as used herein, is calculated by the method of Keenan and Keyes, in "Thermodynamic Properties of Steam," published by The American Society of Mechanical Engineers.

In the manufacture of food products, the prepared material issues, usually on a belt conveyor out of the preparation department as a procession of particles or slices of the fruit or vegetable, and is best preserved by being taken immediately and continuously off the belt to submergence underneath the level of the liquid medium in hopper 56. Similarly, the packaging machines that operate in the packaging department operate best continuously, from the flow of finished friable particles that we deliver on belt 125.

By our centrifugal machine 146, we remove films of the medium and prevent the liquid being driven into empty pores of the fruit when normal air pressure is applied. Thereby we achieve desired low oil contents on our finished product, which is crisp and friable, and is porous with empty macropores. Pineapples when fully ripe and sliced perpendicularly to the direction of the axis or core, make a strikingly novel fruit chip of high flavor. Onions, similarly sliced, make an attractive fluffy "hay-like" product of pungent flavor. Ripe bananas processed by our process do not stick together when sliced, and do not stick to the apparatus; and the full ripe flavor of the sweet banana is preserved, in contrast to the starchy taste of other banana chips that are made from unripe or starchy bananas.

The processing oil in our operation picks up some small particles that give it the flavor of the fruit being processed unless the oil is washed, as we show in FIG. 2, where the vegetable oil is purified and heated by the body of water 46 on which it floats, and picks up units of heat, calories or kilogram calories (kg.cal.) which are transferred by contact of the oil to the fruit to overcome the latent heat of vaporization of moisture in the fruit, and cause water to rise, as water vapor above the surface of the liquid medium.

Characteristically, in our liquid heat transfer process, moisture is evaporated from biological products in the first stage at initial temperatures that are comparatively low, such as approximately the range 70°–30° C. Vapor head pressures over the liquid level in the first stage are maintained in a range such as 100–35 torr. This arrangement of pressures and temperatures makes it possible to evaporate the major portion of the moisture of such particles with inexpensive heat from sources such as solar water heaters, geothermal water heaters, by-product steam or hot water, and the like. Likewise, the vapor which arises from the first stage of dehydration, and which constitutes the major portion of the biological water of the particles, can be readily condensed in a surface or other condenser that is cooled by water which is maintained close to the temperature of the dew point of the ambient atmosphere, by passing the cooling water through an ordinary water cooling tower or a cooling pond.

After the initial stage of dehydration has been completed, and the major portion of the moisture has been evaporated, the particles are moved to the next more advanced stage where the vapor-head pressure is lower and the temperature of the liquid heat transfer medium is higher, and the minor portion of moisture begins to evaporate. The process of movement to stations of lower pressure and higher temperature may be continued for several stations or stages of advancement of the particles until the particles have finally reached the last station of the dehydration series where the liquid heat transfer medium enters the system at about 125°–95° C. and the vapor-head pressure over the liquid has been reduced to about 10-3 torr. Then the particles are quenched in cool oil and reduced to about ambient atmospheric temperature, then the cool oil is drained, removed by centrifuge, and the dehydrated particles are then restored to normal atmospheric pressure.

If desired, the vacuum at the end of the cooling and centrifuging stages may be broken with nitrogen or other preserving gas; or the particles may be canned by a vacuum canning machine without permitting air to enter the pores.

The rate at which the progression of particles moves through the process depends upon thickness of the particles. Thus thin slices of about 1.6 mm., of apple or pineapple, can be put through the foregoing dehydrating process in less than sixty minutes, but thicker particles of 10 or 12 mm. thickness require 2 hours or more to be reduced to the final range of about 6% to 2% moisture content.

The drawing of vacuum, except for the operation of removing air from the primary condenser, where a small mechanical vacuum pump can be used, resolves into providing means for compressing and condensing the gases that arise over the various stations in our process. These gases are predominantly water vapor; they contain traces of leaked air plus metabolic gases of the biological substances being dehydrated. The major proportion of the water vapor evolved comes from the initial stage or stations, and it is generated at a pressure that makes possible the direct condensation of this vapor in a condenser such as a surface condenser or jet condenser which is cooled by water at a temperature approximating the wet-bulb temperature of ambient atmosphere.

The minor portions of water vapor at pressures of about 3–10 torr can be condensed on cryogenic condensing coils that are cooled by a refrigerant, and the major portion of water vapor can bypass the refrigerated coils and be directly condensed in the primary condenser.

We prefer to compress the minor proportion of the vapor which comes off the food particles in the last stage of dehydration to the pressure at which it is readily condensed in the primary condenser. Thus a single steam jet or a series of steam jets, or a mechanical rotary compressor will compress the large volumes of low-pressure water vapor of the last dehydration stage from the range 3–9 torr to the range 10–60 torr. In this pressure range the vapors can be condensed to liquid and removed by the primary condenser, which may be a cascade condenser fed by water that has been cooled in a water-cooling tower to the temperature range of approximately 1°–40° C.

Heat that has been collected from special sources, is supplied to the dehydrator by means of the purified heat-transfer liquid, which enters the various stages through automatic valves which cause the hot liquid to be sprayed on the food particles.

In order to physically carry out the foregoing thermodynamic operations, special physical apparatus is required, as noted in the foregoing description.

Alternative forms and variations of the process and of the apparatus are given by way of example and illustration that show suitable means for applying our invention in specific instances. However, it is understood that our invention is not confined to the instances given thereby but may be applied broadly, as will become apparent to persons skilled in the art, and it is limited only as defined in the appended claims.

What is claimed is:

1. A multi-stage process of at least two stages for dehydrating and puffing food particles, comprising the steps of:

selecting a charge of food particles, each particle of a size sufficient to contain a plurality of macropores;

introducing said charge of food particles into an encloseable chamber of a vessel and closing said chamber;

removing moisture from said particles by dehydration including;

in a first stage, applying heat to said particles by submerging said particles in a liquid medium having a low vapor pressure at ambient temperatures, raising the temperature of said medium to a first elevated temperature above ambient temperature reducing the pressure on said particles to a first pressure below atmospheric pressure, maintaining said first temperature and said first pressure for a first period of time sufficient to reduce the moisture content of said food particles to between 20% and 50%; and in a subsequent stage removing further moisture from said particles by a non-submerged step of dehydration including supporting said particles above the level of said medium in said chamber;

further increasing the temperature of said liquid medium to a non-submerged temperature above said first temperature by applying heat to said particles by contacting said particles with a continuous spray of said medium;

decreasing the pressure on said particles to a non-submerged pressure below said first pressure and maintaining said non-submerged temperature and non-submerged pressure for a period of time sufficient to reduce the moisture content of said particles to a range of between 20% and about 2%, thereby forming said particles into a puffed condition having a plurality of macropores;

applying a cool medium at about ambient temperature to the particles while maintaining said non-submerged pressure thereon to harden the structure and preserve the macropores; and, centrifuging said particles to remove residue of said liquid medium therefrom.

2. The process of claim 1 wherein said first temperature is between 30 and 70° centigrade and said first pressure is between 7 and 55 torr.

3. The process of claim 1 wherein said non-submerged pressure is maintained in a range of between 1 and 9 torr.

4. The process of claim 1 wherein said submerged step of dehydration includes the further steps of elevating the temperature of said medium to a second temperature intermediate to said first temperature and said non-submerged temperature, and reducing the pressure on said particles to a second pressure intermediate to said first pressure and said non-submerged pressure.

5. The process of claim 4 wherein said non-submerged temperature is in a range of between 42 and 90° centrigrade and said non-submerged pressure is in a range of between 6 and 9 torr.

6. The process of claim 5 wherein first period of time is between 10 and 30 minutes; and said non-submerged period of time is between 5 and 30 minutes.

7. The process of claim 4 wherein:

said first period of time is between 10 and 30 minutes, said second temperature and pressure are maintained for a period of time that is between 5 and 30 minutes; and said non-submerged period of time is between 20 and 60 minutes.

8. The process of claim 1 wherein said process includes selecting a pressure vessel having an inlet, an outlet, and movable wall means defining a plurality of movable chambers movable between communication with said inlet to communication with said outlet, moving each of said chambers in sequence into communication with said inlet, introducing a charge of said particles into each chamber establishing a plurality of treatment zones between said inlet and said outlet by establishing zones of different temperatures and pressures for carrying out said dehydration; and moving said particles in steps by said movable walls through a first zone and at least a second zone during the submerged step and the non-submerged step respectively.

9. The process of claim 8 comprising the step of continuously circulating said liquid medium through said vessel; and continuously withdrawing water vapor from said vessel.

10. The process of claim 9 comprising the step of:

removing detritus food particles from the medium by floating said liquid medium on a body of water and settling said detritus into said underlying body of water.

11. The process of claim 10 comprising transferring heat to said liquid medium by means of said body of water.

12. The process of claim 11 comprising applying heat to said body of water by collecting solar energy and transferring said energy to said body of water.

13. A continuous process for dehydrating and puffing a procession of food particles comprising the steps of:

selecting a pressure vessel having an inlet, an outlet, and movable wall means defining a plurality of movable chambers movable in succession between communication with said inlet to communication with said outlet, establishing a plurality of treatment zones within said vessel between said inlet and said outlet by establishing zones of different temperatures and pressures, moving said chambers in succession into communication with said inlet, selecting and introducing a charge of food particles of sufficient size to contain macropores into said successive chambers when communicating with said inlet, submerging the charge of particles in each chamber in an edible liquid medium of low vapor pressure, moving said particles by means of said movable walls through a first treatment zone while establishing and maintaining the temperature of said medium in a range between 30 and 70° centrigrade and a pressure on said particles within a range between 7 and 55 torr, thereby evaporating the major part of the biological water content of the particles, moving said partially dehydrated particles by means of said movable walls through at least another treatment zone, and further dehydrating said partially dehydrated particles in said other zone by the steps of establishing and maintaining the temperature in said other zone in a range between 70 and 125 degrees centigrade and a pressure less than the pressure in said first zone, maintaining said partially dehydrated particles in said other zone for sufficient time for reducing the water content of the particles to less than 6% by weight and thereby creating macropores in said particles, cooling said particles of reduced water content to harden the structure and preserve the macropores, moving each successive charge of hardened particles by said movable wall means into communication with said outlet, and discharging said hardened particles from the respective chamber.

14. The method of claim 13 comprising reducing the pressure in the other treatment zone to less than 40 torr and then gradually reducing said pressure to about three torr.

15. The method of claim 14 comprising the steps of draining the liquid medium away from the partially dehydrated particles after moving said particles to said other zone, and applying and maintaining a spray of medium at a temperature of from 80 to 125° centigrade over the particles until the said particles are reduced to a water content of about 2%.

16. The method of claim 15 comprising draining the liquid medium from the particles of reduced water content before they are cooled.

17. The invention of claim 16 comprising discharging the drained particles in a procession for movement toward packaging and shipment.

18. The process of claim 13 wherein the step of submerging said particles in said liquid medium is carried out prior to introducing said particles into said chamber.

19. The process of claim 18 wherein the step of selecting said pressure vessel includes selecting a vessel having at least four chambers, and wherein the step of introducing a charge of particles into a chamber is carried out simultaneously with the processing of particles in at least one chamber in each of said first treatment zone and said other zone, and the step of cooling particles in another chamber.

20. The process of claim 19 wherein the step of cooling said particles includes the steps of supporting said particles above the level of said liquid medium in said chamber and applying a spray of said liquid medium at ambient temperature.

* * * * *